US012317021B2

(12) United States Patent
Yeh

(10) Patent No.: US 12,317,021 B2
(45) Date of Patent: May 27, 2025

(54) EARPHONE

(71) Applicant: Beijing Honor Device Co., Ltd., Beijing (CN)

(72) Inventor: Chienfeng Yeh, Beijing (CN)

(73) Assignee: Beijing Honor Device Co., Ltd., Beijing (CN)

( * ) Notice: Subject to any disclaimer, the term of this patent is extended or adjusted under 35 U.S.C. 154(b) by 0 days.

(21) Appl. No.: 18/019,125

(22) PCT Filed: Aug. 17, 2022

(86) PCT No.: PCT/CN2022/113159
§ 371 (c)(1),
(2) Date: Feb. 1, 2023

(87) PCT Pub. No.: WO2023/077908
PCT Pub. Date: May 11, 2023

(65) Prior Publication Data

US 2024/0259720 A1 Aug. 1, 2024

(30) Foreign Application Priority Data

Nov. 5, 2021 (CN) ......................... 202111307435.7

(51) Int. Cl.
*H04R 1/10* (2006.01)

(52) U.S. Cl.
CPC ......... *H04R 1/1016* (2013.01); *H04R 1/1083* (2013.01); *H04R 2460/11* (2013.01)

(58) Field of Classification Search
CPC . H04R 1/1016; H04R 1/1083; H04R 2460/11
See application file for complete search history.

(56) References Cited

U.S. PATENT DOCUMENTS

| | | | | |
|---|---|---|---|---|
| 8,774,444 | B2 * | 7/2014 | Tiscareno ............ | H04R 1/1016 381/328 |
| 11,381,898 | B2 | 7/2022 | Choi et al. | |
| 11,564,026 | B2 | 1/2023 | Ji et al. | |
| 2012/0093331 | A1 | 4/2012 | Lin et al. | |
| 2012/0321103 | A1 | 12/2012 | Smailagic et al. | |
| 2015/0172801 | A1 | 6/2015 | Huang | |
| 2017/0118548 | A1 | 4/2017 | Liu et al. | |
| 2020/0382856 | A1 * | 12/2020 | Liu ..................... | H04R 1/1075 |

(Continued)

FOREIGN PATENT DOCUMENTS

| | | |
|---|---|---|
| CN | 202587329 U | 12/2012 |
| CN | 204761648 U | 11/2015 |
| CN | 105592380 A | 5/2016 |

(Continued)

*Primary Examiner* — David L Ton
(74) *Attorney, Agent, or Firm* — WOMBLE BOND DICKINSON (US) LLP

(57) ABSTRACT

Embodiment of this application provides an earphone. The earphone includes at least a housing and at least one eartip. The housing includes a housing body and a sound outlet connected to the housing body. At least one first vent hole is disposed on the housing. When the eartip cooperates with the sound outlet, the at least one first vent hole is completely exposed or at least partially shielded, which can effectively alleviate an occlusion effect while avoiding impact on sound quality and a noise reduction effect of the earphone.

18 Claims, 19 Drawing Sheets

(56) References Cited

U.S. PATENT DOCUMENTS

| | | | | |
|---|---|---|---|---|
| 2021/0185429 | A1* | 6/2021 | Smith .................. | H04R 1/1091 |
| 2021/0258677 | A1 | 8/2021 | Choi et al. | |

FOREIGN PATENT DOCUMENTS

| | | | |
|---|---|---|---|
| CN | 106165442 | A | 11/2016 |
| CN | 106686478 | A | 5/2017 |
| CN | 206575572 | U | 10/2017 |
| CN | 206698397 | U | 12/2017 |
| CN | 210491165 | U | 5/2020 |
| CN | 112019959 | A | 12/2020 |
| CN | 212628341 | U | 2/2021 |
| CN | 113271512 | A | 8/2021 |
| CN | 213990984 | U | 8/2021 |
| CN | 114245254 | A | 3/2022 |
| KR | 102299650 | B1 | 9/2021 |
| WO | 2017185333 | A1 | 11/2017 |

* cited by examiner

EARPHONE

CROSS-REFERENCE TO RELATED APPLICATIONS

This application is a national stage of International Application No. PCT/CN2022/113159, filed on Aug. 17, 2022, which claims priority to Chinese Patent Application No. 202111307435.7, filed on Nov. 5, 2021. The disclosures of both of the aforementioned application are hereby incorporated by reference in their entireties.

TECHNICAL FIELD

Embodiments of this application relate to the field of electronic device technologies, and in particular, to an earphone.

BACKGROUND

An earphone is an energy converter. After receiving an electronic signal sent by a media player or a receiver, the earphone converts the electronic signal into an audible sound wave by using a speaker close to an ear canal, and the earphone is an essential accessory of a portable electronic device such as a mobile phone, a walkman, and a radio. In particular, a Bluetooth earphone, for example, a true wireless stereo (True Wireless Stereo, TWS for short) earphone, has become a prerequisite for people, for example, young people, because the Bluetooth earphone has advantages of being convenient to carry and avoiding winding of a transmission line.

Generally, the earphone includes an eartip, a housing, and a speaker located in the housing. A sound outlet is disposed on the housing, and the eartip cooperates with the sound outlet. The speaker divides an inner cavity of the housing into a front cavity and a rear cavity, where the front cavity is a part of the inner cavity that has the sound outlet, and the rear cavity is a part of the inner cavity that is away from the sound outlet. To prevent ear discomfort caused by increased pressures of an ear canal and the front cavity as the sound outlet and the eartip protrude into the ear canal when the earphone is worn, in a related technology, a front vent hole is usually disposed on a housing of an outer circumference of the front cavity to quickly release air flow in the ear canal and the front cavity, so as to quickly balance the pressures of the ear canal and the front cavity.

However, in the foregoing solution, when an area of the front vent hole is excessively large, too much leakage of air flow in the ear canal and the front cavity may affect sound quality and a noise reduction effect of the earphone.

SUMMARY

Embodiments of this application provide an earphone, so as to effectively alleviate an occlusion effect while avoiding impact on sound quality and a noise reduction effect of the earphone.

According to a first aspect, an embodiment of this application provides an earphone, where the earphone includes at least a housing and at least one eartip, where the housing includes a housing body and a sound outlet connected to the housing body, and at least one first vent hole is disposed on the housing; and the eartip cooperates with the sound outlet, so that the at least one first vent hole is completely exposed or at least partially shielded.

According to the earphone provided in this embodiment of this application, at least one first vent hole is disposed on the housing. When the eartip cooperates with the sound outlet, the first vent hole is partially shielded or completely shielded by the sound outlet, or the first vent hole is completely exposed. In this way, when an ear canal of a human body is blocked and an occlusion effect is serious, a cooperation relationship between the eartip and the sound outlet can be adjusted, so that the first vent hole on the housing is completely exposed or a relatively small part is shielded, thereby alleviating or avoiding the occlusion effect. When sound quality and a noise reduction effect of the earphone are poor, a cooperation relationship between the eartip and the sound outlet can be adjusted, so that the first vent hole on the housing is completely shielded or a relatively large part is shielded, thereby improving the sound quality and the noise reduction effect of the earphone. Therefore, in this embodiment of this application, the sound quality and the noise reduction effect of the earphone are prevented from being affected, and the occlusion effect can be effectively alleviated by adjusting the cooperation relationship between the eartip and the sound outlet.

In a possible implementation of the first aspect, the method further includes: a speaker located in the housing, where a first cavity is formed between the housing and a surface that is of the speaker and that faces the sound outlet, and a second cavity is formed between the housing and a surface that is of the speaker and that is away from the sound outlet; and the at least one first vent hole is connected to the first cavity.

The first vent hole is connected to the first cavity. After volume generated by the speaker enters the first cavity, the volume may flow out of the housing through the first vent hole connected to the first cavity. In this way, leakage of the volume can be implemented, and air flow in the ear canal and the first cavity can be released, so as to balance pressures of the ear canal and the first cavity, and avoid an occlusion effect caused by increased pressures of the ear canal and the first cavity, thereby preventing ear discomfort.

In a possible implementation of the first aspect, the sound outlet is configured to output sound generated by the speaker to an ear of a user, and the at least one first vent is configured to conduct the first cavity to an ambient environment. The ambient environment is understood as an external environment or an atmospheric environment outside the earphone and the ear, and the first vent hole is not shielded by the ear, so that air flow in the first cavity can be released quickly.

In a possible implementation of the first aspect, the housing body includes a body part and a surrounding part connected to the body part, where an outer ring side of the surrounding part is connected to the body part, and an inner ring side of the surrounding part is connected to the sound outlet; and an axial direction of the surrounding part is the same as an axial direction of the sound outlet.

In a possible implementation of the first aspect, each the eartip includes an outer enclosing shell and an inner enclosing shell, where the outer enclosing shell is disposed on an outer side of the inner enclosing shell, and the inner enclosing shell is configured to shield the first vent hole.

In a possible implementation of the first aspect, the at least one first vent hole is located on the surrounding part.

In a possible implementation of the first aspect, the at least one eartip includes a first eartip and a second eartip. An axial size of an inner enclosing shell of the first eartip is less than an axial size of an inner enclosing shell of the second eartip. When the first eartip cooperates with the sound outlet, there is an interval between the surrounding part and an end that is of the inner enclosing shell of the first eartip and that is close to the housing body, so that the first vent hole is completely exposed. When the second eartip cooperates with the sound outlet, one end that is of the inner enclosing shell of the second eartip and that is close to the housing body abuts against the surrounding part, so as to shield at least a part of the first vent hole.

In this way, when the ear canal of the human body is blocked and the occlusion effect is serious, the first eartip cooperates with the sound outlet, so that the first vent hole located on the surrounding part is completely exposed, thereby avoiding the occlusion effect. When the sound quality and the noise reduction effect of the earphone are poor, the second eartip cooperates with the sound outlet, so that the first vent hole located on the surrounding part is shielded, thereby improving the sound quality and the noise reduction effect of the earphone.

In a possible implementation of the first aspect, a blocking part is disposed on a side that is of the surrounding part and that is close to the body part, and the blocking part, the surrounding part and an outer side wall of the sound outlet are enclosed together to form a first groove; and an end that is of the inner enclosing shell of the first eartip and that is close to the housing body or an end that is of the inner enclosing shell of the second eartip and that is close to the housing body extends into the first groove.

The blocking part is disposed on the side that is of the surrounding part and that is close to the body part, and the blocking part, the surrounding part and the outer side wall of the sound outlet are enclosed together to form a first groove. In this way, when the inner enclosing shell of the first eartip or the inner enclosing shell of the second eartip shields the first vent hole on the surrounding part, an end that is of the inner enclosing shell of the first eartip and that is close to the housing body or an end that is of the inner enclosing shell of the second eartip and that is close to the housing body extends into the first groove, and the first groove can limit a specific position of the end that is of the inner enclosing shell of the first eartip and that is close to the housing body or the end that is of the inner enclosing shell of the second eartip and that is close to the housing body, so as to avoid relative position movement of the inner enclosing shell of the first eartip or the inner enclosing shell of the second eartip relative to the first vent hole on the surrounding part, thereby improving stability when the inner enclosing shell of the first eartip or the inner enclosing shell of the second eartip shields the first vent hole.

In a possible implementation of the first aspect, at least one second vent hole is further disposed on the body part; and the at least one second vent hole is connected to the first cavity. At least one second vent hole is further disposed on the body part, and at least one second vent hole is connected to the first cavity. In this way, after volume generated by the speaker enters the first cavity, the volume can not only flow out of the housing through the first vent hole connected to the first cavity: but also flow out of the housing through the second vent hole connected to the first cavity. In this way, leakage of the volume can be further implemented, air flow in the ear canal and the first cavity can be better released, so as to better balance pressures of the ear canal and the first cavity; and avoid, to a greater extent, an occlusion effect caused by increased pressures of the ear canal and the first cavity: thereby preventing ear discomfort.

In a possible implementation, the at least one first vent hole is located on a side wall of the sound outlet.

In a possible implementation of the first aspect, at least one third vent hole is disposed on the inner enclosing shell: when the eartip cooperates with the sound outlet, the third vent hole is at least partially opposite to the first vent hole: or the third vent is staggered from the first vent.

When the eartip cooperates with the sound outlet, the third vent hole on the inner enclosing shell of the eartip and the first vent hole on the side wall of the sound outlet are at least partially opposite or staggered. In this way, when the ear canal of the human body is blocked and the occlusion effect is serious, a cooperation relationship between the eartip and the sound outlet can be adjusted, so that the third vent hole on the inner enclosing shell of the eartip is completely opposite or a relatively large part is opposite to the first vent hole on the side wall of the sound outlet, and the first vent hole on the housing is completely exposed or a relatively small part is shielded, thereby alleviating or avoiding the occlusion effect. When the sound quality and the noise reduction effect of the earphone are poor, a cooperation relationship between the eartip and the sound outlet can be adjusted, so that the third vent hole on the inner enclosing shell of the eartip is opposite or staggered from the first vent hole on the side wall of the sound outlet, so that the first vent hole is completely shielded or a relatively large part is shielded, thereby improving the sound quality and the noise reduction effect of the earphone.

In a possible implementation of the first aspect, the at least one first vent hole includes at least one vent hole group; and each vent hole group includes a first sub vent hole and a second sub vent hole. An inner diameter of the first sub vent hole is different from an inner diameter of the second sub vent hole; and an inner diameter of the third vent hole is greater than the inner diameter of the first sub vent hole and the inner diameter of the second sub vent hole. When the eartip cooperates with the sound outlet, the third vent hole is opposite to the first sub vent hole, or the third vent hole is opposite to the second sub vent hole.

In this way, when the ear canal of the human body is blocked and the occlusion effect is serious, a cooperation relationship between the eartip and the sound outlet can be adjusted, so that the third vent hole is opposite to one with a relatively large inner diameter of the first sub vent hole and the second sub vent hole, so as to implement a relatively large amount of leakage, thereby alleviating or avoiding the occlusion effect. When the sound quality and the noise reduction effect of the earphone are poor, a cooperation relationship between the eartip and the sound outlet can be adjusted, so that the third vent hole is opposite to one with a relatively small inner diameter of the first sub vent hole and the second sub vent hole, so as to implement a relatively small amount of leakage, thereby improving the sound quality and the noise reduction effect of the earphone.

In a possible implementation of the first aspect, the at least one vent hole group includes a first vent hole group and a second vent hole group, where a line between a first sub vent hole in the first vent hole group and a first sub vent hole in the second vent hole group does not intersect a line between a second sub vent hole in the first vent hole group and a second sub vent hole in the second vent hole group. The at least one eartip includes a third eartip, and there are two third vent holes on a side wall of an inner enclosing shell of the third eartip.

When the third eartip and the sound outlet are in a first cooperation state, one of the two third vent holes is opposite to the first sub vent hole in the first vent hole group, and the other of the two third vent holes is opposite to the first sub vent hole in the second vent hole group; and when the third eartip and the sound outlet are in a second cooperation state, one of the two third vent holes is opposite to the second sub vent hole in the first vent hole group, and the other of the two third vent holes is opposite to the second sub vent hole in the second vent hole group.

In a possible implementation of the first aspect, the at least one vent hole group includes a first vent hole group and a second vent hole group, where a line between a first sub vent hole in the first vent hole group and a first sub vent hole in the second vent hole group intersects with a line between a second sub vent hole in the first vent hole group and a second sub vent hole in the second vent hole group. The at least one eartip includes a fourth eartip and a fifth eartip. There are two third vent holes on a side wall of an inner enclosing shell of the fourth eartip and a side wall of an inner enclosing shell of the fifth eartip.

When the fourth eartip cooperates with the sound outlet, one of the two third vent holes on the side wall of the inner enclosing shell of the fourth eartip is opposite to the first sub vent hole in the first vent hole group; and the other of the two third vent holes is opposite to the first sub vent hole in the second vent hole group; and when the fifth eartip cooperates with the sound outlet, one of the two third vent holes on the side wall of the inner enclosing shell of the fifth eartip is opposite to the second sub vent hole in the first vent hole group, and the other of the two third vent holes is opposite to the second sub vent hole in the second vent hole group.

In a possible implementation of the first aspect, the at least one eartip includes a sixth eartip and a seventh eartip. The sixth eartip cooperates with the sound outlet, or the seventh eartip cooperates with the sound outlet. An axial size of the sixth eartip is different from an axial size of the seventh eartip.

According to a second aspect, an embodiment of this application provides an earphone, including a housing and at least one eartip, where the housing is provided with a sound outlet: the at least one eartip includes a sixth eartip and a seventh eartip: the sixth eartip cooperates with the sound outlet, or the seventh eartip cooperates with the sound outlet; and an axial size of the sixth eartip is different from an axial size of the seventh eartip.

According to the earphone provided in this embodiment of this application, two different eartips are disposed, that is, the sixth eartip and the seventh eartip are disposed. The axial size of the sixth eartip is different from the axial size of the seventh eartip. In specific use, in an earphone that includes an eartip of a relatively large axial size and the sound outlet, a length of the eartip is relatively long, an in-ear depth of the earphone is relatively deep, and therefore the earphone has good sealing after being worn. In an earphone that includes an eartip of a relatively small axial size and the sound outlet, a length of the eartip is relatively short, an in-ear depth of the earphone is relatively shallow; and therefore the earphone has a large amount of leakage after being worn. In this way, when an ear canal of a human body is blocked and an occlusion effect is serious, an eartip with a relatively small axial size can be used to increase an amount of leakage, thereby alleviating or avoiding the occlusion effect. When sound quality and a noise reduction effect of the earphone are poor, an eartip with a relatively large axial size and good sealing performance is used, to improve the sound quality and the noise reduction effect of the earphone. Therefore, in this embodiment of this application, the sound quality and the noise reduction effect of the earphone are prevented from being affected, and the occlusion effect can be effectively alleviated by using the sixth eartip or the seventh eartip with different axial sizes.

In a possible implementation of the first aspect or the second aspect, each the eartip further includes a separator, where the separator is connected to the inner enclosing shell, and the separator divides the inner enclosing shell into a first part and a second part. One end that is of the first part and that is away from the second part is connected to the outer enclosing shell; and the second part and the separator are enclosed together to form a fitting cavity, and when the eartip cooperates with the sound outlet, at least a part of the sound outlet is located in the fitting cavity. The second part is configured to shield the first vent hole.

In a possible implementation of the first aspect or the second aspect, one of an outer peripheral wall of the sound outlet and an inner peripheral wall of the inner enclosing shell is provided with at least one protruding part, and the other of the outer peripheral wall of the sound outlet and the inner peripheral wall of the inner enclosing shell is provided with at least one second groove; and the protruding part cooperates with the second groove. In this way, positions of the sound outlet and the eartip can be limited, so as to avoid relative position movement of the sound outlet and the eartip during a cooperation process, and even a problem that the eartip falls off from the sound outlet.

In a possible implementation of the first aspect or the second aspect, at least one opening is further disposed on the separator, and the opening is configured to output a sound output from the sound outlet to an ear of a user. At least one opening is disposed on the separator, and the opening outputs sound output from the sound outlet to the ear of the user, so that energy generated by the speaker in the housing is smoothly transmitted to the ear of the user, thereby optimizing a sound production effect of the earphone.

In a possible implementation of the first aspect or the second aspect, the housing further includes a stem, where one end of the stem is connected to a side that is of the housing and that is away from the sound outlet. In this way, a structure of the earphone in this embodiment of this application may also be applicable to an earphone with a stem.

Figure 1:
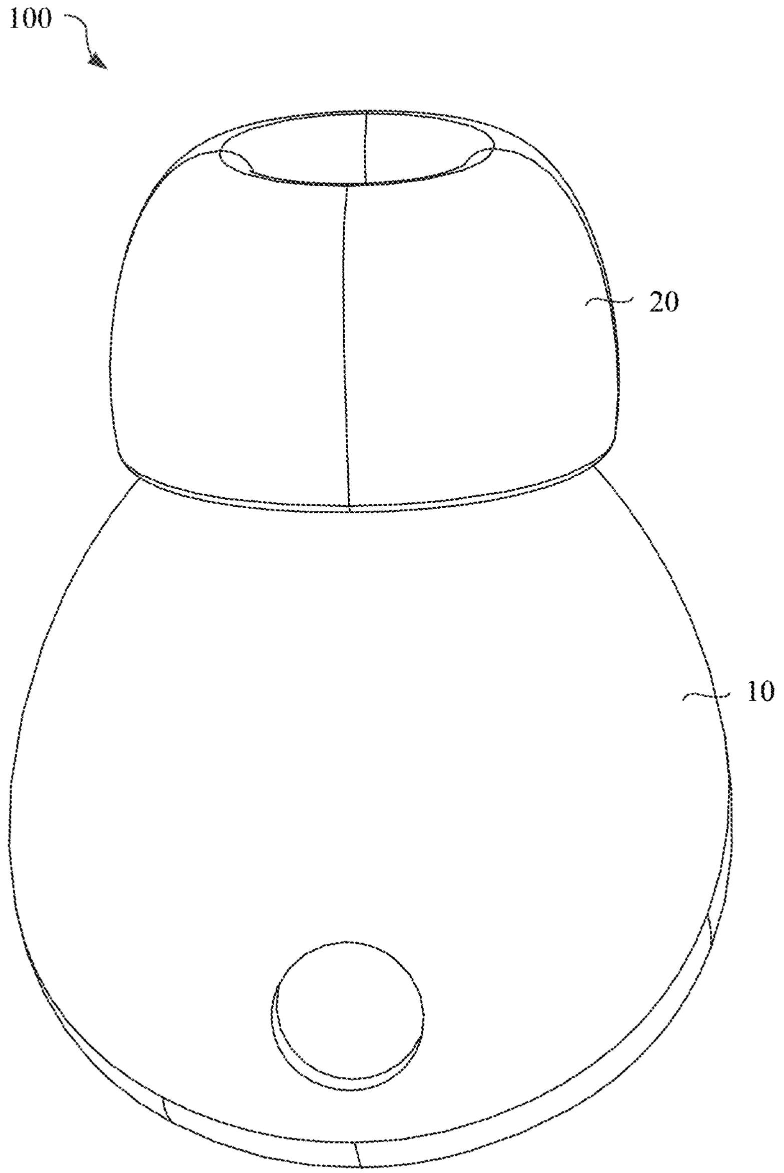
FIG. 1 is a schematic diagram of an overall structure of an earphone according to an embodiment of this application.

| Description of reference numerals: |
| --- |
| 100- Earphone; |
| 10- Housing; |
| 101- First cavity; |
| 11- Housing body; |
| 111- Body part; |
| 112- Surrounding part; |
| 113- Blocking part; |
| 1121- Outer ring side; |
| 1122- Inner ring side; |
| 12- Sound outlet; |
| 121- Protruding part; |
| 20- Eartip; |
| 210- First eartip; |
| 220- Second eartip; |
| 230- Third eartip; |
| 240- Fourth eartip; |
| 250- Fifth eartip; |
| 260- Sixth eartip; |
| 270- Seventh eartip; |
| 201- Outer enclosing shell; |
| 202- Inner enclosing shell; |
| 2020- Second groove; |
| 2021- First part; |
| 2022- Second part; |
| 203- Separator; |
| 2031- Opening; |
| 204- Fitting cavity; |
| 30- First vent hole; |
| 301- First vent hole group; |
| 302- Second vent hole group; |
| 3011- First sub vent hole; |
| 3012- Second sub vent hole; |
| 40- First groove; |
| 50- Third vent hole; |
| 60- Second vent hole; |
| 70- Stem; |
| L1- Interval. |

DESCRIPTION OF EMBODIMENTS

Terms used in implementations of this application are only used to explain specific embodiments of this application, and are not intended to limit this application. The following clearly describes implementations in embodiments of this application with reference to accompanying drawings.

An earphone is a pair of conversion units. The earphone receives an electronic signal sent by a media player or a receiver, and converts the electronic signal into an audible sound wave by using a speaker close to an ear. An earphone is generally divided into a wired earphone and a wireless earphone, for example, a Bluetooth earphone. The Bluetooth earphone may be a true wireless stereo (True Wireless Stereo, TWS for short) earphone.

The Bluetooth earphone such as a TWS earphone ushered in explosive growth in a short term. More and more people are accustomed to using TWS earphones in offices, travel, and fitness places. The TWS earphone has also become a prerequisite for young people, and young people have developed a personal habit of using the TWS earphone. Compared with a conventional wired earphone, the TWS earphone has advantages of being convenient to carry and avoiding winding of a transmission line.

In a related technology, an earphone includes an eartip, a housing, and a speaker located in a housing, where the housing is provided with a sound outlet, and the eartip cooperates with the sound outlet. The speaker divides an inner cavity of the housing into a front cavity and a rear cavity, where the front cavity is a part with the sound outlet in the inner cavity, and the rear cavity is a part away from the sound outlet in the inner cavity. Generally, for an in-ear earphone, in a wearing state, an eartip and a sound outlet extend into an ear canal, and other parts of the housing except the sound outlet are accommodated in a cavum conchae. The earphone is fastened to an ear by using an inner wall of the cavum conchae and an inner wall of the ear canal, so that the earphone is worn.

It should be noted that, in a sound transmission process of the earphone, bone conduction energy may cause a mandible and a soft tissue near an external ear canal to vibrate, which further causes a cartilage wall of the ear canal to vibrate, and generated energy is subsequently transferred into an air volume in a tube. When the ear canal is blocked, most of the energy is trapped, causing a level of sound pressure delivered to an eardrum and ultimately a cochlea to rise, resulting in an occlusion effect.

To prevent ear discomfort caused by an occlusion effect caused by increased pressures of an ear canal and the front cavity as the sound outlet and the eartip protrude into the ear canal when the earphone is worn, in a related technology, a front vent hole is usually disposed on a housing of an outer circumference of the front cavity to quickly release air flow in the ear canal and the front cavity, so as to quickly balance the pressures of the ear canal and the front cavity. However, when an area of the front vent hole is excessively large, too much air leakage of the ear canal and the front cavity may affect sound quality and a noise reduction effect of the earphone; and when the area of the front vent hole is too large, the occlusion effect is serious.

Based on this, an embodiment of this application provides an earphone, at least one first vent hole is disposed on the housing. When the eartip cooperates with the sound outlet, the first vent hole is partially shielded or completely shielded by the sound outlet, or the first vent hole is completely exposed. In this way, when an ear canal of a human body is blocked and the occlusion effect is serious, a cooperation relationship between the eartip and the sound outlet can be adjusted, so that the first vent hole on the housing is completely exposed or a relatively small part is shielded, thereby alleviating or avoiding the occlusion effect. When sound quality and a noise reduction effect of the earphone are poor, a cooperation relationship between the eartip and the sound outlet can be adjusted, so that the first vent hole on the housing is completely shielded or a relatively large part is shielded, thereby improving the sound quality and the noise reduction effect of the earphone. Therefore, in this embodiment of this application, the sound quality and the noise reduction effect of the earphone are prevented from being affected, and the occlusion effect can be effectively alleviated by adjusting the cooperation relationship between the eartip and the sound outlet.

With reference to accompanying drawings, the following uses different embodiments as examples to describe a specific structure of the earphone in detail.

Embodiment 1

Figure 2:
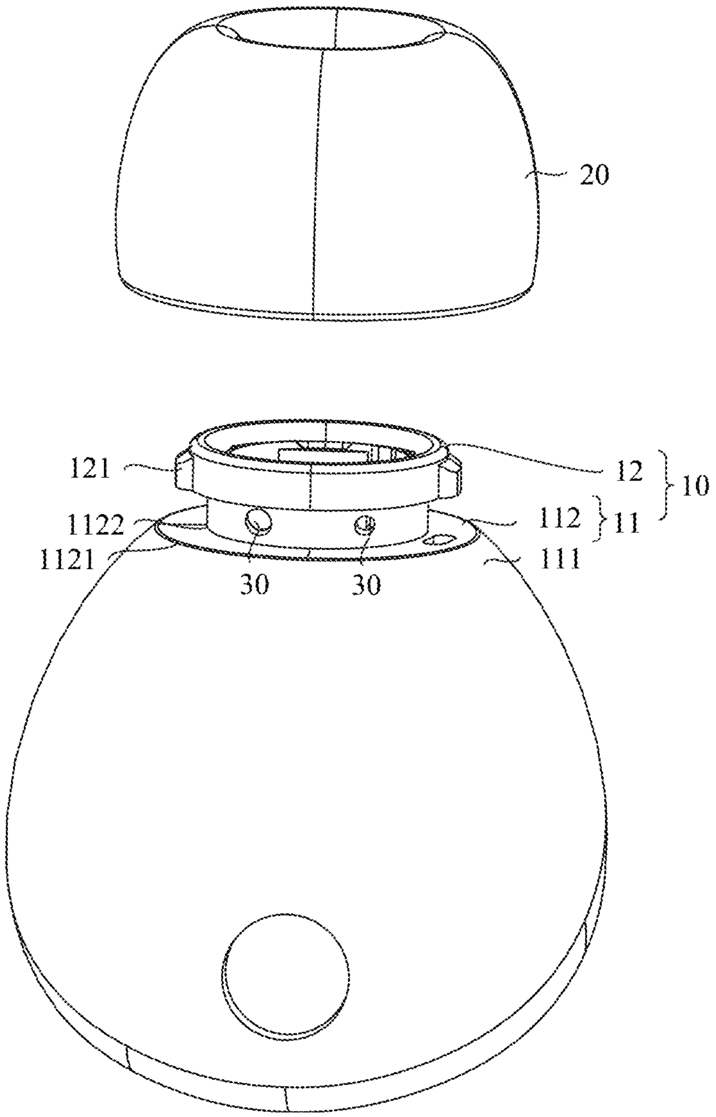
FIG. 2 is a schematic diagram of a split structure of an earphone according to an embodiment of this application.

Referring to FIG. 1 and FIG. 2, an embodiment of this application provides an earphone 100. The earphone 100 may include at least a housing 10 and at least one eartip 20. Specifically, as shown in FIG. 2, the housing 10 may include a housing body 11 and a sound outlet 12, where the sound outlet 12 is connected to the housing body 11, and at least one first vent hole 30 is disposed on the housing 10. The eartip 20 cooperates with the sound outlet 12, so that at least one first vent hole 30 is completely exposed or at least partially shielded.

Specifically, in a use process, when the eartip 20 cooperates with the sound outlet 12, the sound outlet 12 partially shields the first vent hole 30, or the sound outlet 12 completely shields the first vent hole 30, or the sound outlet 12 completely exposes the first vent hole 30.

In this way, when an ear canal of a human body is blocked and an occlusion effect is serious, a cooperation relationship between the eartip 20 and the sound outlet 12 can be adjusted, so that the first vent hole 30 located on the housing 10 is completely exposed or a relatively small part is shielded, and a sound wave caused by vibration is released through an external ear canal by increasing an amount of leakage, thereby alleviating or avoiding the occlusion effect. When sound quality and a noise reduction effect of the earphone 100 are poor, a cooperation relationship between the eartip 20 and the sound outlet 12 can be adjusted, so that the first vent hole 30 on the housing 10 is completely shielded or a relatively large part is shielded, thereby improving the sound quality and the noise reduction effect of the earphone 100. Therefore, in this embodiment of this application, the sound quality and the noise reduction effect of the earphone 100 are prevented from being affected, and the occlusion effect can be effectively alleviated by adjusting the cooperation relationship between the eartip 20 and the sound outlet 12.

It can be understood that the earphone 100 provided in this embodiment of this application may further include a speaker (not shown in the figure), where the speaker is located in the housing 10, a first cavity 101 (refer to FIG. 4 or FIG. 5) is formed between the housing 10 and a surface that is of the speaker and that faces the sound outlet 12, a second cavity (not shown in the figure) is formed between the housing 10 and a surface that is of the speaker and that is away from the sound outlet 12, and at least one first vent hole 30 is connected to the first cavity 101.

In this way, after volume generated by the speaker enters the first cavity 101, the volume may flow out of the housing 10 through the first vent hole 30 connected to the first cavity 101. In this way, leakage of the volume can be implemented, and air flow in the ear canal and the first cavity 101 can be released, so as to balance pressures of the ear canal and the first cavity 101, and avoid an occlusion effect caused by increased pressures of the ear canal and the first cavity 101, thereby preventing ear discomfort.

In this embodiment of this application, the sound outlet 12 may be configured to output sound generated by the speaker to an ear of a user, and at least one first vent hole 30 may be configured to conduct the first cavity 101 to an ambient environment. The ambient environment is understood as an external environment or an atmospheric environment outside the earphone 100 and the ear, and the first vent hole 30 is not shielded by the ear, so that air flow in the first cavity 101 can be released quickly.

In addition, it can be understood that the vent hole may also be referred to as a sound vent hole. Specifically, the sound vent hole is usually used to connect gas in a front cavity (that is, the first cavity 101) of the housing 10 to the external environment, so as to transmit part of the sound in the front cavity to the external environment through the vent hole.

As shown in FIG. 2, the housing body 11 may include a body part 111 and a surrounding part 112, where the surrounding part 112 is connected to the body part 111. Specifically, an outer ring side 1121 of the surrounding part 112 is connected to the body part 111, an inner ring side 1122 of the surrounding part 112 is connected to the sound outlet 12, and an axial direction of the surrounding part 112 is consistent with an axial direction of the sound outlet 12.

Figure 3:
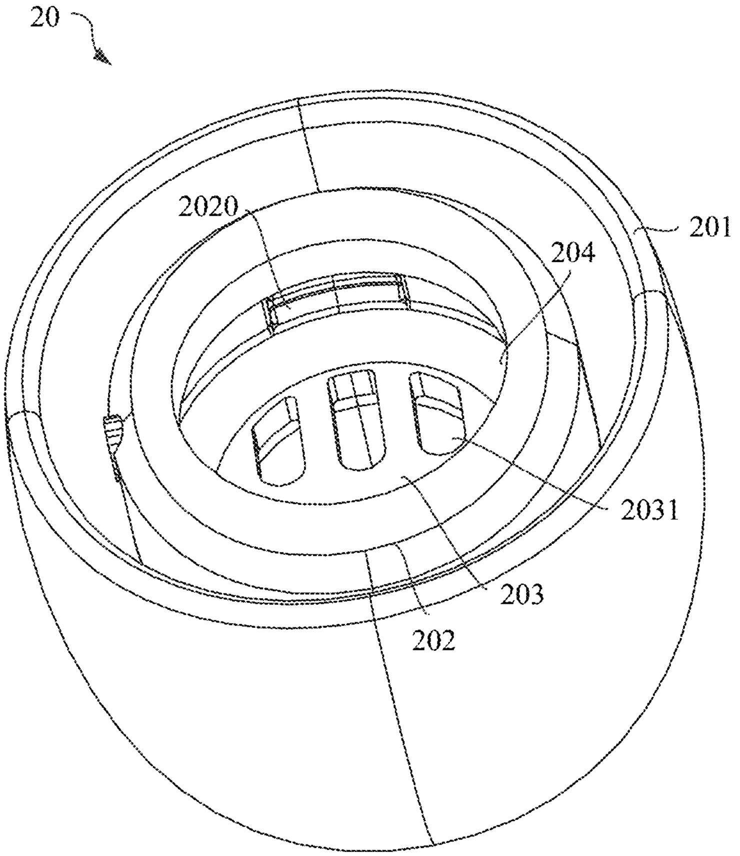
FIG. 3 is a schematic diagram of a structure of an eartip in an earphone according to an embodiment of this application.

In some embodiments, as shown in FIG. 3, each eartip 20 may include an outer enclosing shell 201 and an inner enclosing shell 202, where the outer enclosing shell 201 may be disposed on an outer side of the inner enclosing shell 202, and the inner enclosing shell 202 is configured to shield the first vent hole 30.

Figure 6:
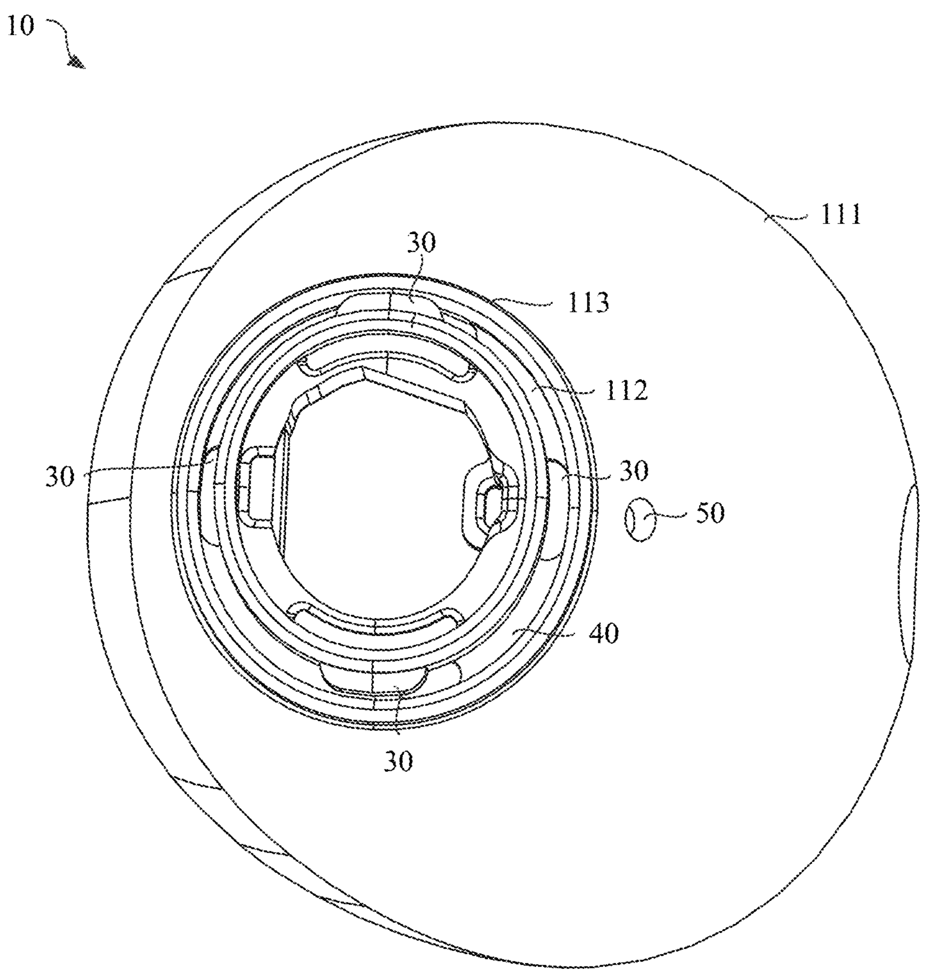
FIG. 6 is a schematic diagram of a structure of a housing in an earphone according to an embodiment of this application.
Figure 7:
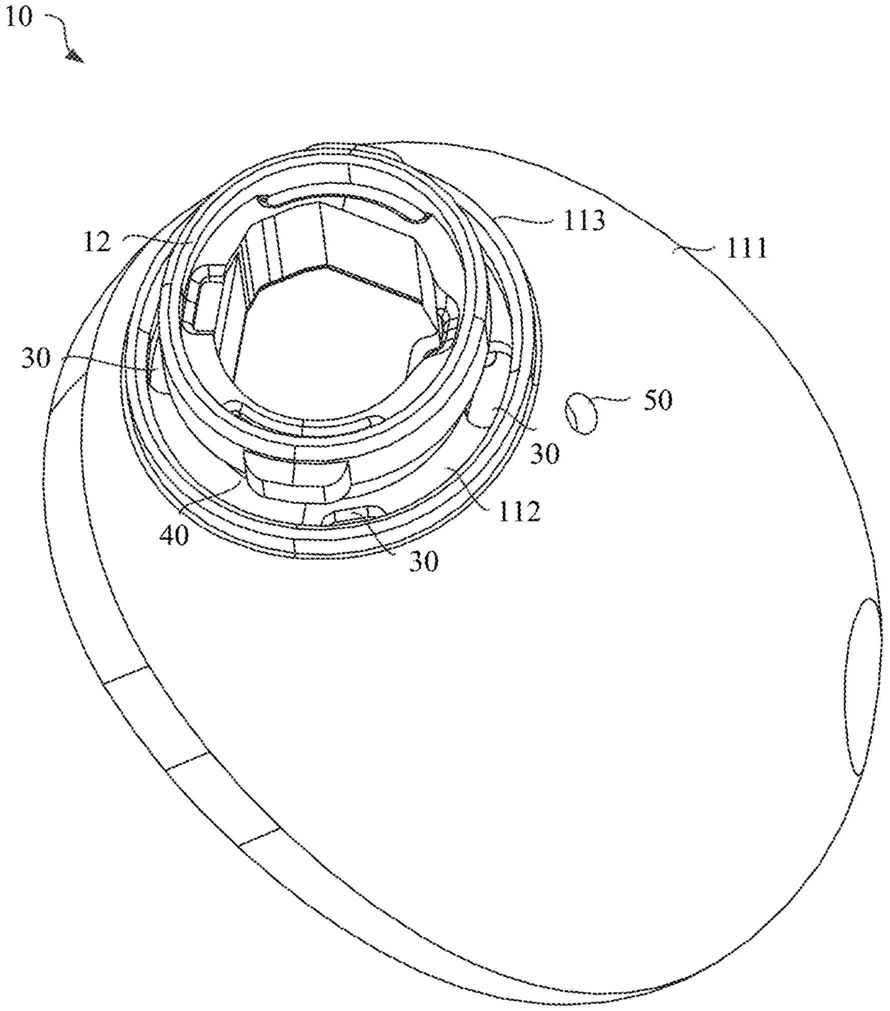
FIG. 7 is a schematic diagram of a structure of a housing in an earphone according to an embodiment of this application.

It can be understood that, in this embodiment of this application, the at least one first vent hole 30 may be located on the surrounding part 112 (refer to FIG. 6 or FIG. 7).

Figure 4:
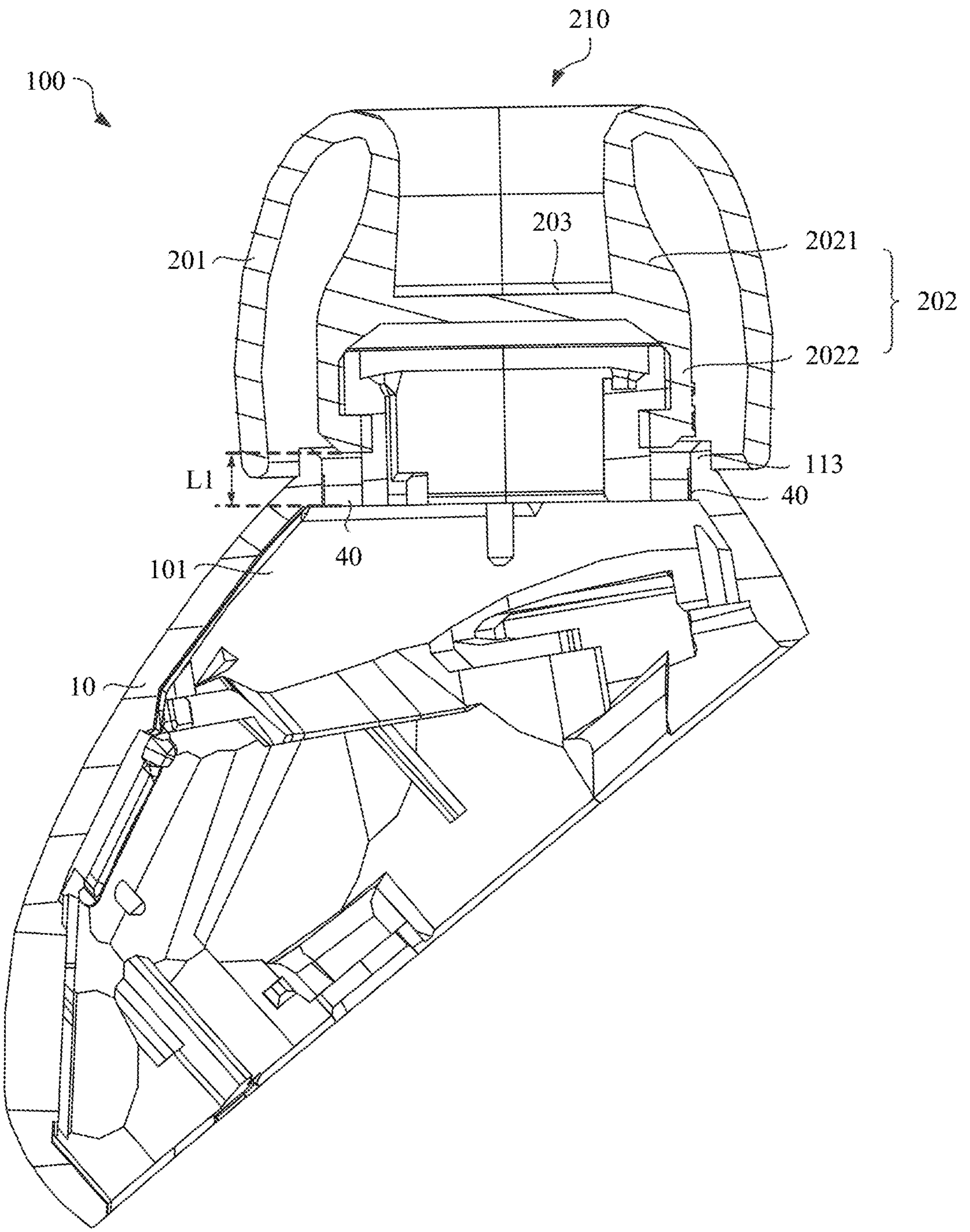
FIG. 4 is a schematic cross-sectional diagram of a housing and an eartip in an earphone according to an embodiment of this application.
Figure 5:
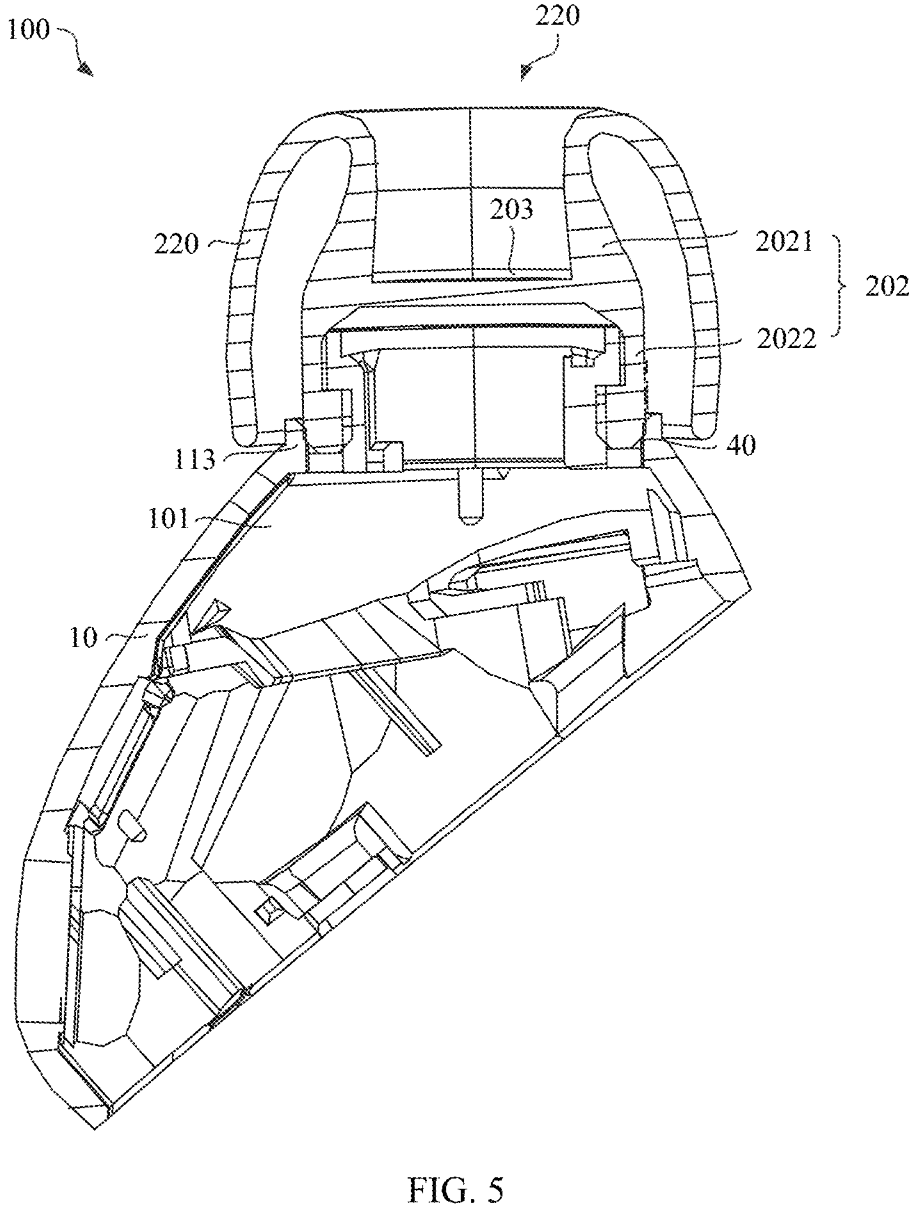
FIG. 5 is a schematic cross-sectional diagram of a housing and an eartip in an earphone according to an embodiment of this application.

Specifically, as shown in FIG. 4 and FIG. 5, the at least one eartip 20 may include a first eartip 210 and a second eartip 220, where an axial size of an inner enclosing shell 202 of the first eartip 210 is different from an axial size of an inner enclosing shell 202 of the second eartip 220.

It should be noted that the axial size of the inner enclosing shell 202 of the first eartip 210 refers to a size of the inner enclosing shell 202 of the first eartip 210 in an axial direction of the first eartip 210; and the axial size of the inner enclosing shell 202 of the second eartip 220) refers to a size of the inner enclosing shell 202 of the second eartip 220 in an axial direction of the second eartip 220.

For example, the axial size of the inner enclosing shell 202 of the first eartip 210 is less than the axial size of the inner enclosing shell 202 of the second eartip 220. When the first eartip 210 cooperates with the sound outlet 12, there is an interval LI between the inner enclosing shell 202 of the first eartip 210 and the surrounding part 112, so that the first vent hole 30 is completely exposed. When the second eartip 220 cooperates with the sound outlet 12, the inner enclosing shell 202 of the second eartip 220 abuts against the surrounding part 112 to shield at least a part of the first vent hole 30.

It can be understood that, as shown in FIG. 3 and FIG. 4, each eartip 20 may further include a separator 203, where the separator 203 is connected to the inner enclosing shell 202. In addition, the separator 203 may divide the inner enclosing shell 202 into a first part 2021 and a second part 2022. Referring to FIG. 5, one end that is of the first part 2021 of the inner enclosing shell 202 and that is away from the second part 2022 of the inner enclosing shell 202 may be connected to the outer enclosing shell 201, and the second part 2022 of the inner outer enclosing shell 202 and the separator 203 are enclosed together to form a fitting cavity 204. When the eartip 20 cooperates with the sound outlet 12, at least a part of the sound outlet 12 is located in the fitting cavity 204, and the second part 2022 is configured to shield the first vent hole 30.

Specifically, an axial size of the second part 2022 of the inner enclosing shell 202 of the first eartip 210 is less than an axial size of the second part 2022 of the inner enclosing shell 202 of the second eartip 220. FIG. 4 is a sectional view when the first eartip 210 cooperates with the sound outlet 12. FIG. 5 is a sectional view when the second eartip 220 cooperates with the sound outlet 12.

When the first eartip 210 cooperates with the sound outlet 12, as shown in FIG. 4, there is an interval LI between the second part 2022 of the inner enclosing shell 202 of the first eartip 210 and the surrounding part 112, so that the first vent hole 30 is completely exposed. When the second eartip 220 cooperates with the sound outlet 12, as shown in FIG. 5, the second part 2022 of the inner enclosing shell 202 of the second eartip 220 abuts against the surrounding part 112 to shield at least a part of the first vent hole 30.

In this way, when the ear canal of the human body is blocked and the occlusion effect is serious, the first eartip 210 cooperates with the sound outlet 12, and there is an interval LI between the second part 2022 of the inner enclosing shell 202 of the first eartip 210 and the surrounding part 112, so that the first vent hole 30 located on the surrounding part 112 is completely exposed, thereby avoiding the occlusion effect. Alternatively, when the sound quality and the noise reduction effect of the earphone 100 are poor, the second eartip 220 cooperates with the sound outlet 12, and the second part 2022 of the inner enclosing shell 202 of the second eartip 220 abuts against the surrounding part 112, so that the first vent hole 30 located on the surrounding part 112 is shielded, thereby improving the sound quality and the noise reduction effect of the earphone 100.

That is, in this embodiment of this application, two eartips (the first eartip 210 and the second eartip 220) are designed to be compatible with sound quality, a noise reduction effect, and an occlusion effect, so as to improve experience of a user when using the earphone 100. Wearing the second eartip 220 in a scenario with a serious occlusion effect such as exercise can effectively alleviate the occlusion effect. Wearing the first eartip 210 can ensure sound quality and a noise reduction effect.

In addition, in this embodiment of this application, as shown in FIG. 6 or FIG. 7, at least one second vent hole 50 is further disposed on the body part 111, and at least one second vent hole 50 is connected to the first cavity 101.

In this way, after the volume generated by the speaker enters the first cavity 101, the volume can not only flow out of the housing 10 through the first vent hole 30 connected to the first cavity 101, but also flow out of the housing 10 through the second vent hole 50 connected to the first cavity 101. In this way: leakage of the volume can be further implemented, air flow in the ear canal and the first cavity 101 can be better released, so as to better balance pressures of the ear canal and the first cavity 101, and avoid, to a greater extent, an occlusion effect caused by increased pressures of the ear canal and the first cavity 101, thereby preventing ear discomfort.

Figure 8:
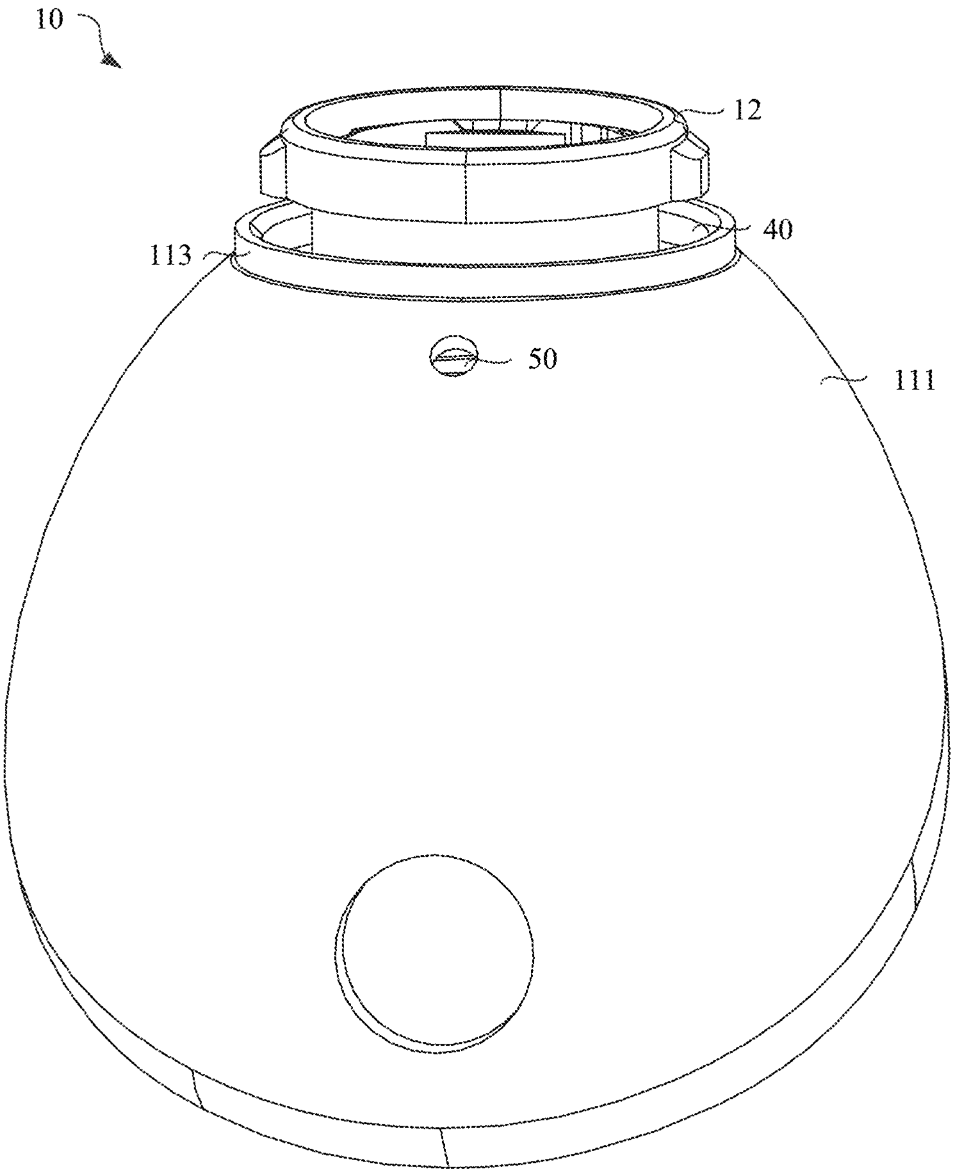
FIG. 8 is a schematic diagram of a structure of a housing in an earphone according to an embodiment of this application.

As shown in FIG. 8, in this embodiment of this application, a blocking part 113 may be disposed on a side that is of the surrounding part 112 and that is close to the body part 111. In this way, the blocking part 113, the surrounding part 112 and an outer wall of the sound outlet 12 may be enclosed together to form a first groove 40. At least a part of the second part 2022 of the inner enclosing shell 202 of the first eartip 210 extends into the first groove 40, or at least a part of the second part 2022 of the inner enclosing shell 202 of the second eartip 220 extends into the first groove 40.

In this way, when the second part 2022 of the inner enclosing shell 202 of the first eartip 210 or the second part 2022 of the inner enclosing shell 202 of the second eartip 220 shields the first vent hole 30 on the surrounding part 112, at least a part of the second part 2022 of the inner enclosing shell 202 of the first eartip 210 or the second part 2022 of the inner enclosing shell 202 of the second eartip 220 extends into the first groove 40, so that the first groove 40 can limit a position of the second part 2022 of the inner enclosing shell 202 of the first eartip 210 or a position of the second part 2022 of the inner enclosing shell 202 of the second eartip 220 to prevent the second part 2022 of the inner enclosing shell 202 of the first eartip 210 or the second part 2022 of the inner enclosing shell 202 of the second eartip 220 from moving relative to the first vent hole 30 on the surrounding part 112, thereby improving stability when the second part 2022 of the inner enclosing shell 202 of the first eartip 210 or the second part 2022 of the inner enclosing shell 202 of the second eartip 220 shields the first vent hole 30.

In addition, in this embodiment of this application, one of an outer peripheral wall of the sound outlet 12 and an inner peripheral wall of the outer enclosing shell 201 may be provided with at least one protruding part 121, the other of the outer peripheral wall of the sound outlet 12 and the inner peripheral wall of the outer enclosing shell 201 may be provided with at least one second groove 2020, and the protruding part 121 cooperates with the second groove 2020.

It can be easily understood that, in this embodiment of this application, a cooperation manner between the protruding part 121 and the second groove 2020 includes the following two possible implementations:

A possible implementation is as follows: The outer peripheral wall of the sound outlet 12 is provided with at least one protruding part 121, the inner peripheral wall of the outer enclosing shell 201 of the eartip 20 is provided with at least one second groove 2020, and the protruding part 121 cooperates with the second groove 2020. For example, in FIG. 2, the outer peripheral wall of the sound outlet 12 are provided with two protruding parts 121, and the inner peripheral wall of the outer enclosing shell 201 of the eartip 20 are provided with two second grooves 2020.

Another possible implementation is as follows: An inner peripheral wall of the outer enclosing shell 201 of the eartip 20 is provided with at least one protruding part 121, an outer peripheral wall of the sound outlet 12 is provided with at least one second groove 2020, and the protruding part 121 cooperates with the second groove 2020.

In this way, the protruding part 121 cooperates with the second groove 2020, that is, positions of the sound outlet 12 and the eartip 20 can be limited, so as to avoid a relative position movement of the sound outlet 12 and the eartip 20 in a cooperation process, and even a problem that the eartip 20 falls off from the sound outlet 12.

In addition, in a possible implementation, as shown in FIG. 3, at least one opening 2031 may be further disposed on the separator 203, and the opening 2031 is configured to output the sound output from the sound outlet 12 to the ear of the user. The opening 2031 outputs the sound output from the sound outlet 12 to the ear of the user, so that energy generated by the speaker in the housing 10 can be smoothly transmitted to the ear of the user, thereby optimizing a sound output effect of the earphone 100.

Figure 9:
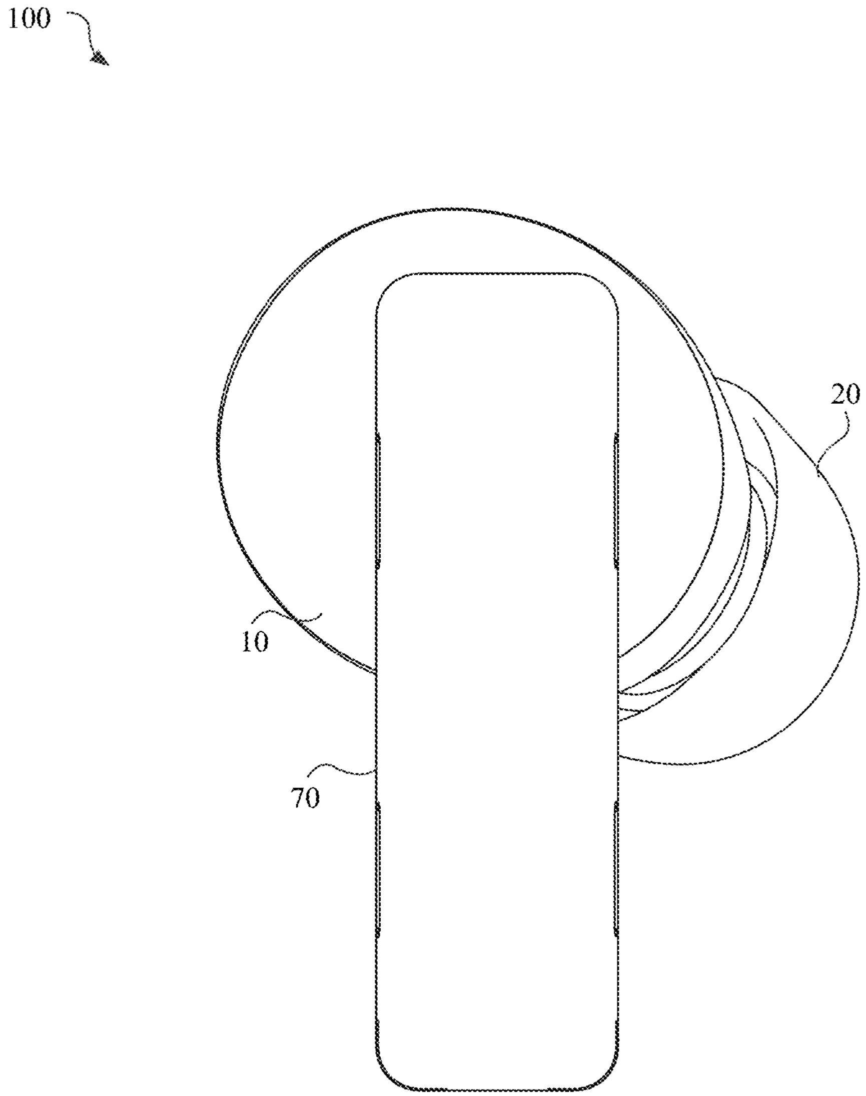
FIG. 9 is a schematic diagram of a structure of a housing, an eartip, and a stem in an earphone according to an embodiment of this application.
Figure 10:
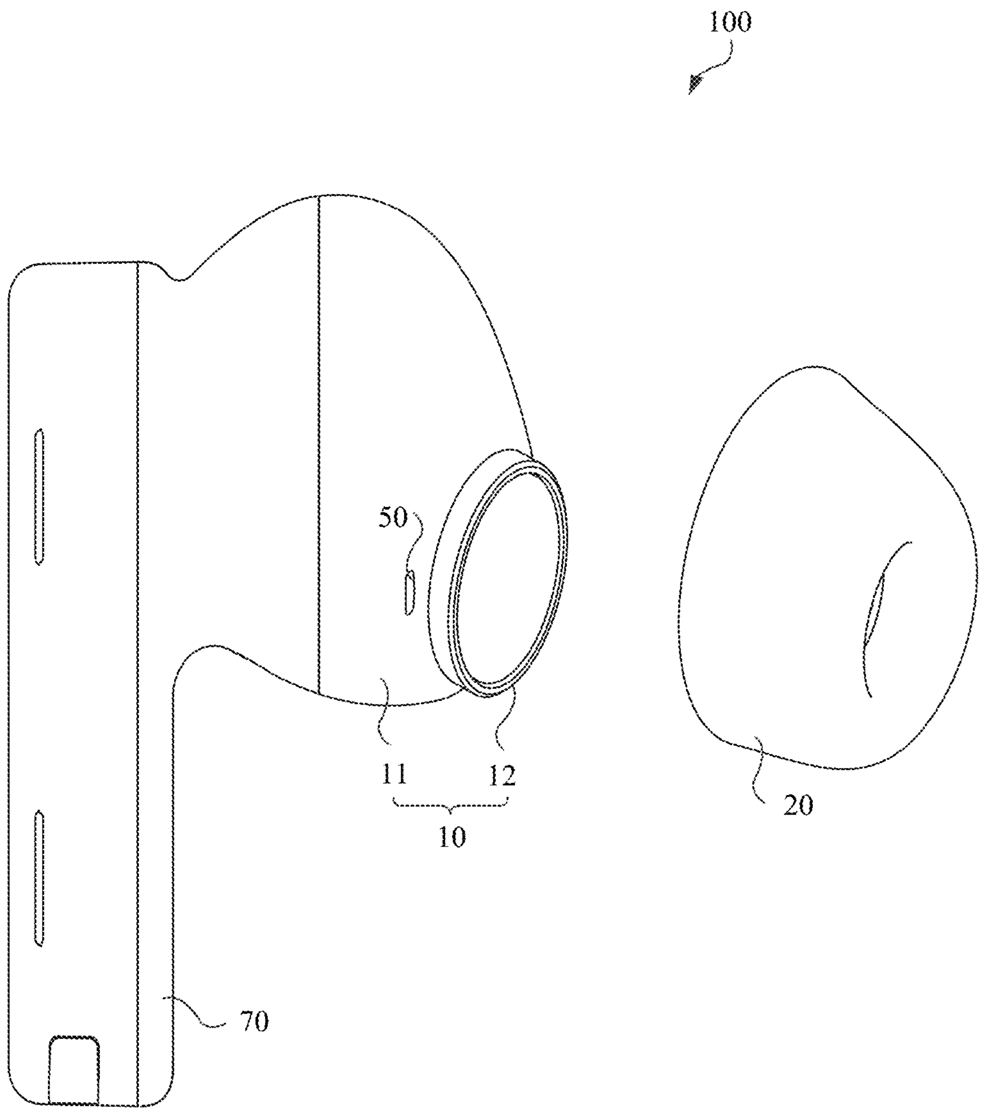
FIG. 10 is a schematic diagram of a structure of a housing, an eartip, and a stem in an earphone according to an embodiment of this application.

In addition, as shown in FIG. 9 or FIG. 10, the housing 10 may further include a stem 70, and one end of the stem 70 is connected to a side that is of the housing 10 and that is away from the sound outlet 12. In this way, a structure of an earphone in this embodiment of this application may also be applicable to the earphone 100 with the stem 70.

Embodiment 2

An embodiment of this application further provides an earphone 100 of another structure. A difference between Embodiment 1 and Embodiment 2 lies in that specific arrangement positions of a first vent hole 30 are different.

Figure 11:
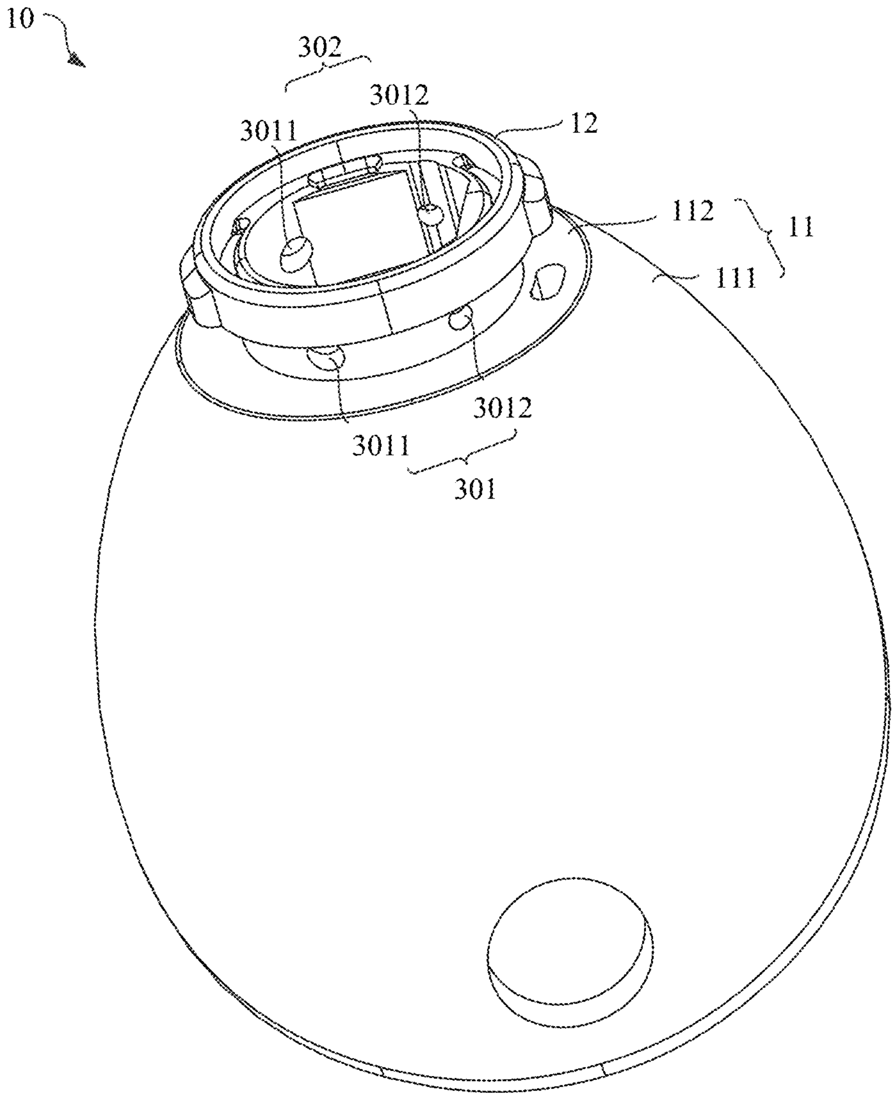
FIG. 11 is a schematic diagram of a structure of a housing in an earphone according to an embodiment of this application.

In this embodiment of this application, at least one first vent hole 30 may be located on a side wall of a sound outlet 12 (refer to FIG. 11).

Specifically, in some embodiments, at least one third vent hole 60 may be disposed on an inner enclosing shell 202. When an eartip 20 cooperates with the sound outlet 12, the third vent hole 60 is at least partially opposite to the first vent hole 30, or the third vent hole 60 is staggered from the first vent hole 30.

In this way, when the eartip 20 cooperates with the sound outlet 12, the third vent hole 60 on the inner enclosing shell 202 of the eartip 20 and the first vent hole 30 on the side wall of the sound outlet 12 are at least partially opposite or staggered. Therefore, when an ear canal of a human body is blocked and an occlusion effect is serious, a cooperation relationship between the eartip 20 and the sound outlet 12 can be adjusted, so that the third vent hole 60 on the inner enclosing shell 202 of the eartip 20 and the first vent hole 30 on the side wall of the sound outlet 12 are completely opposite or a relatively large part are opposite, so that the first vent hole 30 is completely exposed or a relatively small part is shielded, thereby alleviating or avoiding the occlusion effect. When sound quality and a noise reduction effect of the earphone 100 are poor, a cooperation relationship between the eartip 20 and the sound outlet 12 can be adjusted, so that the third vent hole 60 on the inner enclosing shell 202 of the eartip 20 is partially opposite to or staggered from the first vent hole 30 on the side wall of the sound outlet 12, so that the first vent hole 30 is completely shielded or a relatively large part is shielded, thereby improving the sound quality and the noise reduction effect of the earphone 100.

It should be noted that, in this embodiment of this application, the at least one first vent hole 30 may include at least one vent hole group. Each vent hole group may include a first sub vent hole 3011 and a second sub vent hole 3012. An inner diameter of the first sub vent hole 3011 is different from an inner diameter of the second sub vent hole 3012. In addition, an inner diameter of the third vent hole 60 may be greater than the inner diameter of the first sub vent hole 3011 and the inner diameter of the second sub vent hole 3012. When the eartip 20 cooperates with the sound outlet 12, the third vent hole 60 may be opposite to the first sub vent hole 3011, or the third vent hole 60 may be opposite to the second sub vent hole 3012.

In this way, when the ear canal of the human body is blocked and the occlusion effect is serious, a cooperation relationship between the eartip 20 and the sound outlet 12 can be adjusted, so that the third vent hole 60 is opposite to one with a relatively large inner diameter of the first sub vent hole 3011 and the second sub vent hole 3012, so as to implement a relatively large amount of leakage, thereby alleviating or avoiding the occlusion effect. When the sound quality and the noise reduction effect of the earphone 100 are poor, a cooperation relationship between the eartip 20) and the sound outlet 12 can be adjusted, so that the third vent hole 60 is opposite to one with a relatively small inner diameter of the first sub vent hole 3011 and the second sub vent hole 3012, so as to implement a relatively small amount of leakage, thereby improving the sound quality and the noise reduction effect of the earphone 100.

For example, the inner diameter of the first sub vent hole 3011 is greater than the inner diameter of the second sub vent hole 3012. When the eartip 20 cooperates with the sound outlet 12, the third vent hole 60 may be opposite to the first sub vent hole 3011, or the third vent hole 60 may be opposite to the second sub vent hole 3012. In this way, when the ear canal of the human body is blocked and the occlusion effect is serious, a cooperation relationship between the eartip 20) and the sound outlet 12 can be adjusted, so that the third vent hole 60 is opposite to the first sub vent hole 3011, so as to implement a relatively large amount of leakage, thereby alleviating or avoiding the occlusion effect. When the sound quality and the noise reduction effect of the earphone 100 are poor, a cooperation relationship between the eartip 20 and the sound outlet 12 can be adjusted, so that the third vent hole 60 is opposite to the second sub vent hole 3012, so as to implement a relatively small amount of leakage, thereby improving the sound quality and the noise reduction effect of the earphone 100.

It can be understood that, in some embodiments, referring to FIG. 11, the at least one vent hole group may include a first vent hole group 301 and a second vent hole group 302, where a line between a first sub vent hole 3011 in the first vent hole group 301 and a first sub vent hole 3011 in the second vent hole group 302 does not intersect a line between a second sub vent hole 3012 in the first vent hole group 301 and a second sub vent hole 3012 in the second vent hole group 302.

Figure 12:
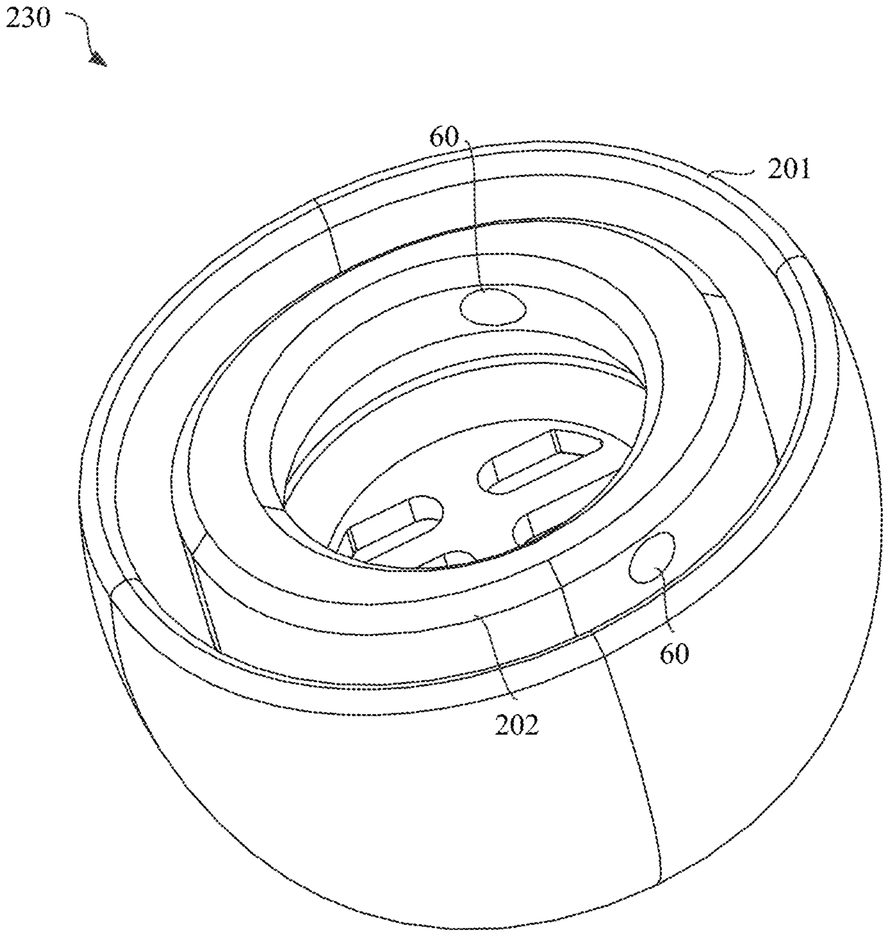
FIG. 12 is a schematic diagram of a structure of an eartip in an earphone according to an embodiment of this application.
Figure 13:
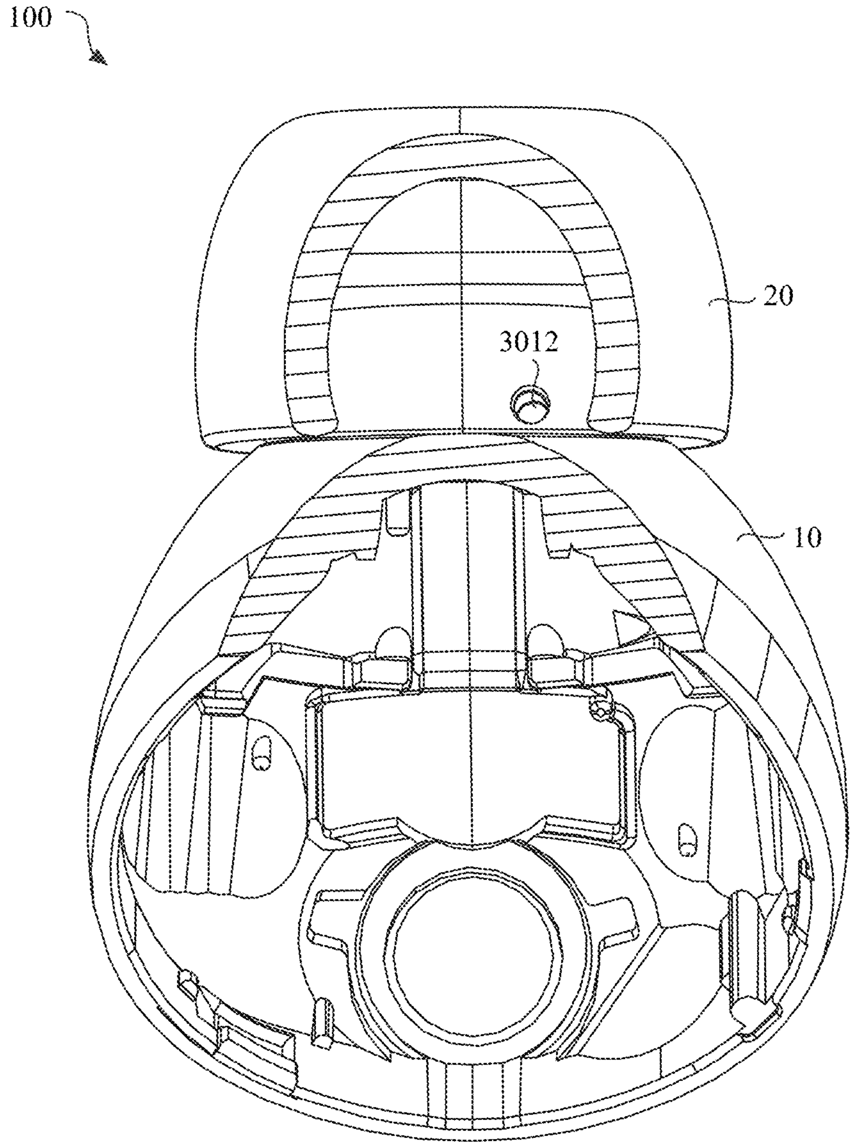
FIG. 13 is a schematic cross-sectional diagram of a housing and an eartip in an earphone according to an embodiment of this application.

The at least one eartip 20 may include a third eartip 230 (refer to FIG. 12). A side wall of an inner enclosing shell 202 of the third eartip 230 may be provided with two third vent holes 60. In actual use, when the third eartip 230 and the sound outlet 12 are in a first cooperation state (refer to FIG. 13), the two third vent holes 60 are respectively opposite to the two first sub vent holes 3011. That is, one of the two third vent holes 60 is opposite to the first sub vent hole 3011 in the first vent hole group 301, and the other of the two third vent holes 60 is opposite to the first sub vent hole 3011 in the second vent hole group 302.

Figure 14:
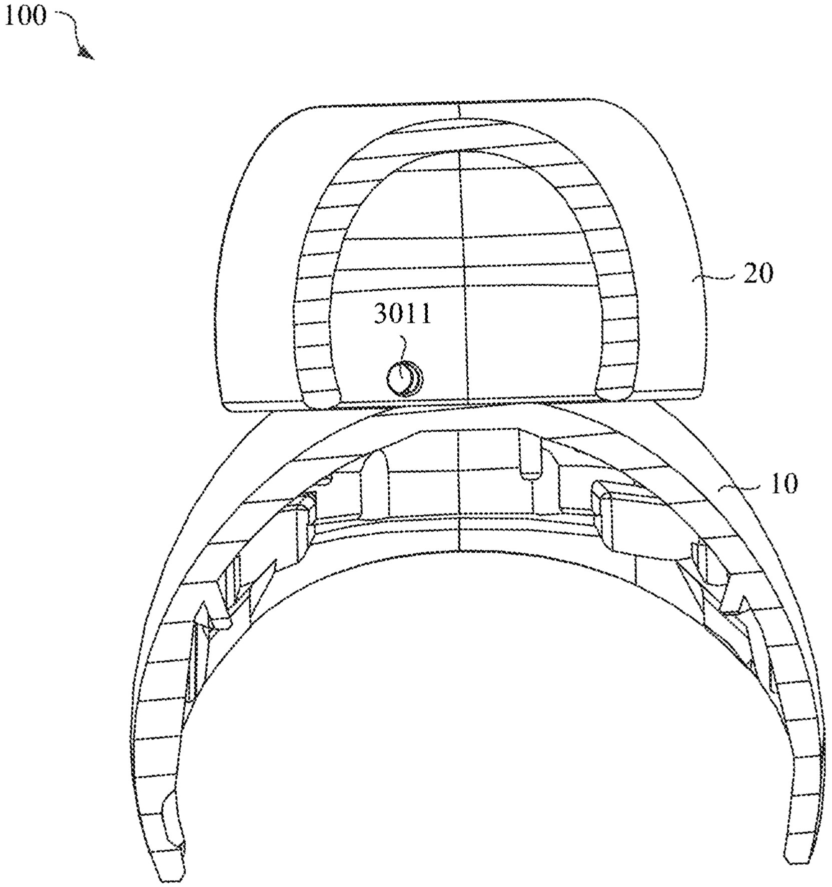
FIG. 14 is a schematic cross-sectional diagram of a housing and an eartip in an earphone according to an embodiment of this application.

When the third eartip 230 and the sound outlet 12 are in a second cooperation state (refer to FIG. 14), the two third vent holes 60 are respectively opposite to the two second sub vent holes 3012, that is, one of the two third vent holes 60 is opposite to the second sub vent hole 3012 in the first vent hole group 301, and the other of the two third vent holes 60 is opposite to the second sub vent hole 3012 in the second vent hole group 302.

For example, the inner diameter of the first sub vent hole 3011 is greater than the inner diameter of the second sub vent hole 3012. When the third eartip 230 cooperates with the sound outlet 12, the two third vent holes 60 may be respectively opposite to the two first sub vent holes 3011, or the two third vent holes 60 may be respectively opposite to the two second sub vent holes 3012. In this way, when the ear canal of the human body is blocked and the occlusion effect is serious, a cooperation relationship between the third eartip 230 and the sound outlet 12 can be adjusted, so that the third vent hole 60 is opposite to the first sub vent hole 3011, so as to implement a relatively large amount of leakage, thereby alleviating or avoiding the occlusion effect. When the sound quality and the noise reduction effect of the earphone 100 are poor, a cooperation relationship between the third eartip 230 and the sound outlet 12 can be adjusted, so that the third vent hole 60 is opposite to the second sub vent hole 3012, so as to implement a relatively small amount of leakage, thereby improving the sound quality and the noise reduction effect of the earphone 100.

That is, in this embodiment of this application, the amount of leakage can be adjusted by wearing the third eartip 230 forward and backward, so as to implement flexible switching between different application scenarios such as listening to songs and noise reduction (a small hole is opened, that is, the two third vent holes 60 are respectively opposite to the two second sub vent holes 3012) and occlusion effect optimization (a large hole is opened, that is, the two third vent holes 60 are respectively opposite to the two first sub vent holes 3011).

Figure 15:
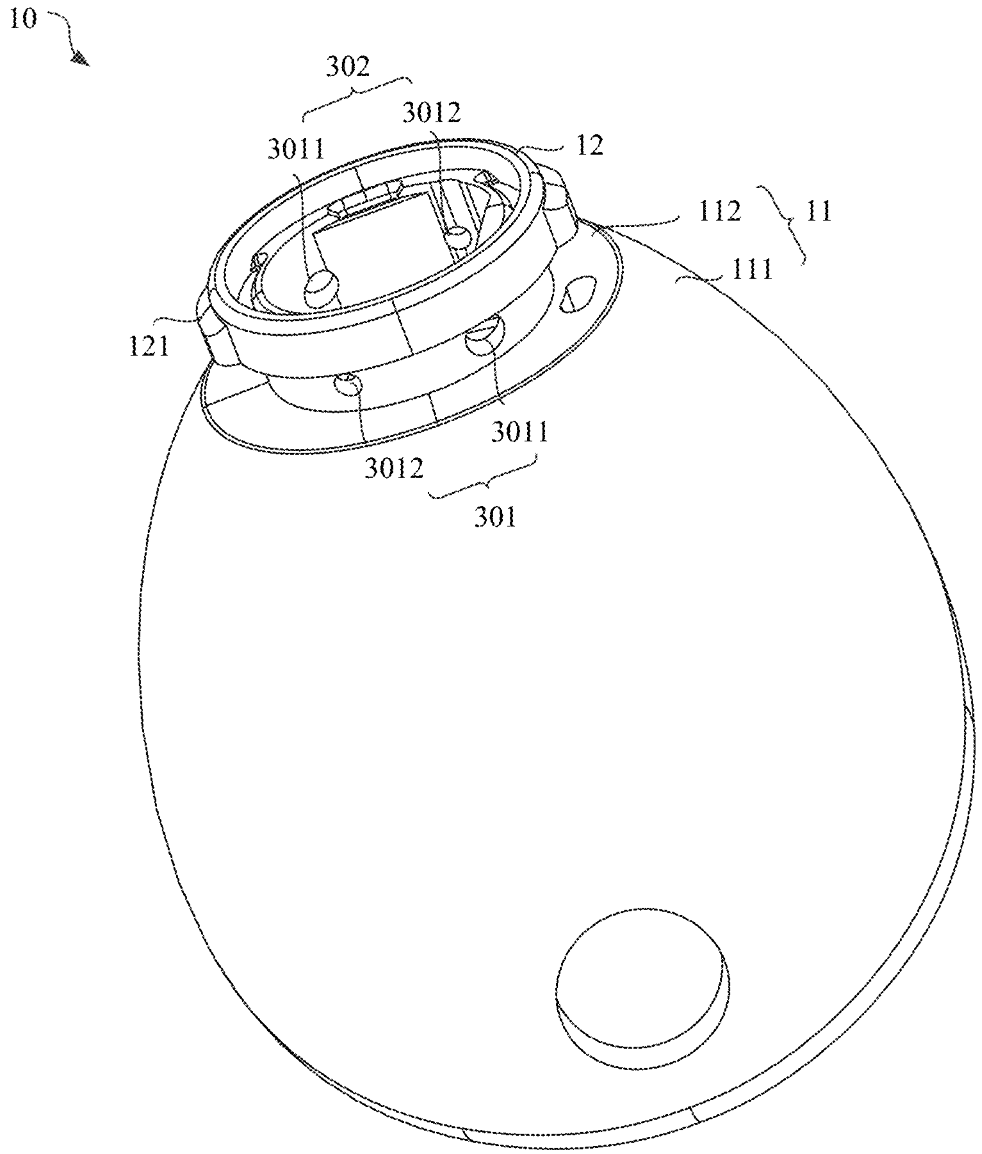
FIG. 15 is a schematic diagram of a structure of a housing in an earphone according to an embodiment of this application.

In some other embodiments, referring to FIG. 15, the at least one vent hole group may include a first vent hole group 301 and a second vent hole group 302, where a line between a first sub vent hole 3011 in the first vent hole group 301 and a first sub vent hole 3011 in the second vent hole group 302 intersects a line between a second sub vent hole 3012 in the first vent hole group 301 and a second sub vent hole 3012 in the second vent hole group 302.

Figure 16:
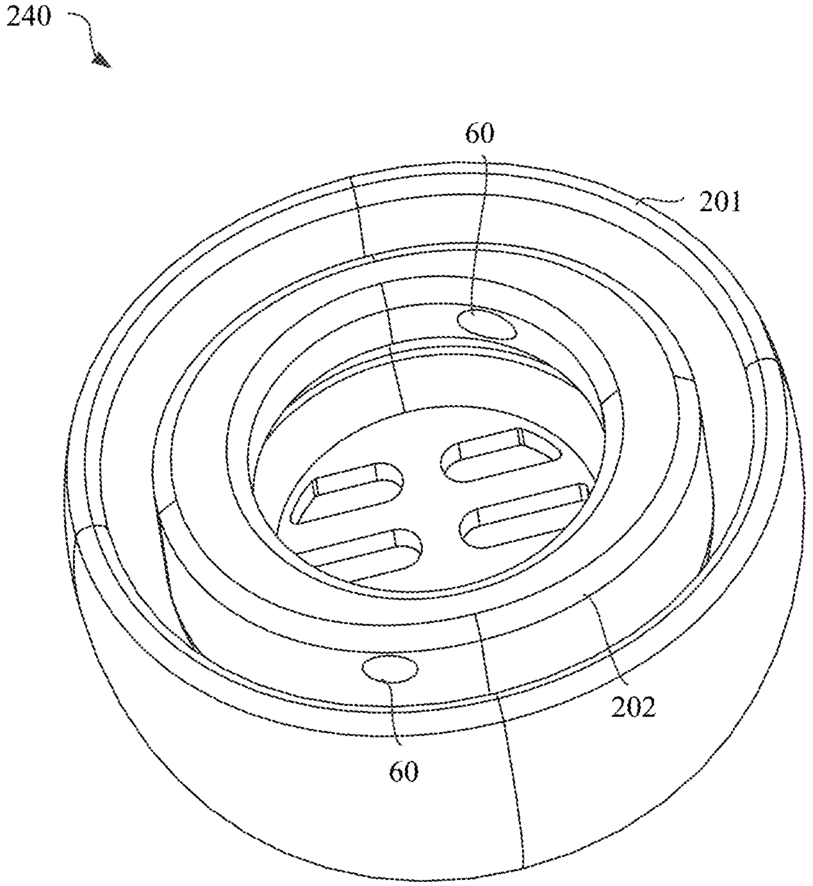
FIG. 16 is a schematic diagram of a structure of an eartip in an earphone according to an embodiment of this application.
Figure 17:
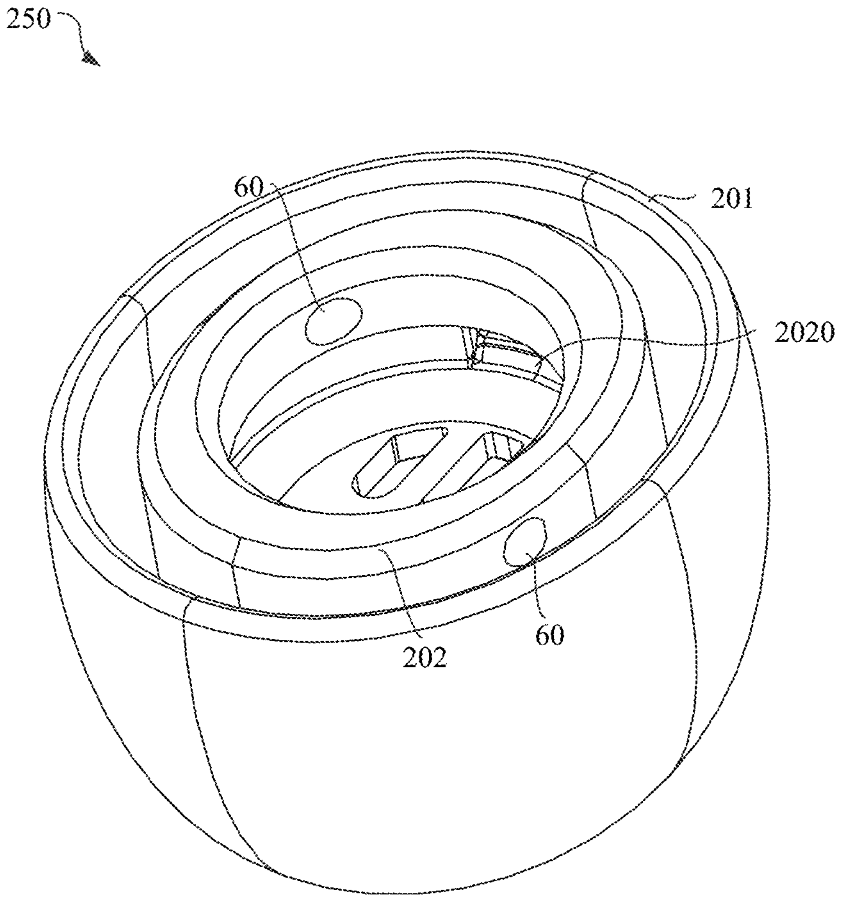
FIG. 17 is a schematic diagram of a structure of an eartip in an earphone according to an embodiment of this application.

As shown in FIG. 16 and FIG. 17, the at least one eartip 20 may include a fourth eartip 240 and a fifth eartip 250. Both a side wall of an inner enclosing shell 202 of the fourth eartip 240 and a side wall of an inner enclosing shell 202 of the fifth eartip 250 are provided with two third vent holes 60.

When the fourth eartip 240 cooperates with the sound outlet 12 (refer to FIG. 16), two third vent holes 60 on the side wall of the inner enclosing shell 202 of the fourth eartip 240 are opposite to the two first sub vent holes 3011. Specifically, one of the two third vent holes 60 on the side wall of the inner enclosing shell 202 of the fourth eartip 240 is opposite to the first sub vent hole 3011 in the first vent hole group 301, and the other of the two third vent holes 60 is opposite to the first sub vent hole 3011 in the second vent hole group 302.

When the fifth eartip 250 cooperates with the sound outlet 12 (refer to FIG. 17), the two third vent holes 60 on the side wall of the inner enclosing shell 202 of the fifth eartip 250 are opposite to the two second sub vent holes 3012. Specifically, one of the third vent holes 60 on the side wall of the inner enclosing shell 202 of the fifth eartip 250 is opposite to the second sub vent hole 3012 in the first vent hole group 301, and the other of the two third vent holes 60 is opposite to the second sub vent hole 3012 in the second vent hole group 302.

For example, the inner diameter of the first sub vent hole 3011 is greater than the inner diameter of the second sub vent hole 3012. When the fourth eartip 240 cooperates with the sound outlet 12, the two third vent holes 60 may be respectively opposite to the two first sub vent holes 3011. Alternatively, when the fifth eartip 250 cooperates with the sound outlet 12, the two third vent holes 60 may be respectively opposite to the two second sub vent holes 3012.

In this way, when the ear canal of the human body is blocked and the occlusion effect is serious, the fourth eartip 240) cooperates with the sound outlet 12, so that the third vent hole 60) is opposite to the first sub vent hole 3011, so as to implement a relatively large amount of leakage, thereby alleviating or avoiding the occlusion effect. When the sound quality and the noise reduction effect of the earphone 100 are poor, the fifth eartip 250 cooperates with the sound outlet 12, so that the third vent hole 60 is opposite to the second sub vent hole 3012, so as to implement a relatively small amount of leakage, thereby improving the sound quality and the noise reduction effect of the earphone 100.

That is, in this embodiment of this application, the amount of leakage may be adjusted by wearing the fourth eartip 240 or the fifth eartip, so as to implement flexible switching between different application scenarios such as listening to songs and noise reduction (a small hole is opened, that is, the fifth eartip 250 is used to make the two third vent holes 60 respectively opposite to the two second sub vent holes 3012) and occlusion effect optimization (a large hole is opened, that is, the fourth eartip 240 is used to make the two third vent holes 60 respectively opposite to the two first sub vent holes 3011).

Other technical features are the same as those in Embodiment 1, and a same technical effect can be achieved. Details are not described herein again.

Embodiment 3

On the basis of the foregoing Embodiment 1 or Embodiment 2, at least two eartips of different lengths may be further designed. Specifically, at least one eartip 20 may include a sixth eartip 260 and a seventh eartip 270. In specific use, the sixth eartip 260 cooperates with a sound outlet 12, or the seventh eartip 270) cooperates with the sound outlet 12.

An axial size of the sixth eartip 260 is different from an axial size of the seventh eartip 270). It should be noted that the axial size of the sixth eartip 260 refers to a size of the sixth eartip 260 in an axial direction of the sixth eartip 260; and the axial size of the seventh eartip 270 refers to a size of the seventh eartip 270 in an axial direction of the seventh eartip 270.

Figure 18:
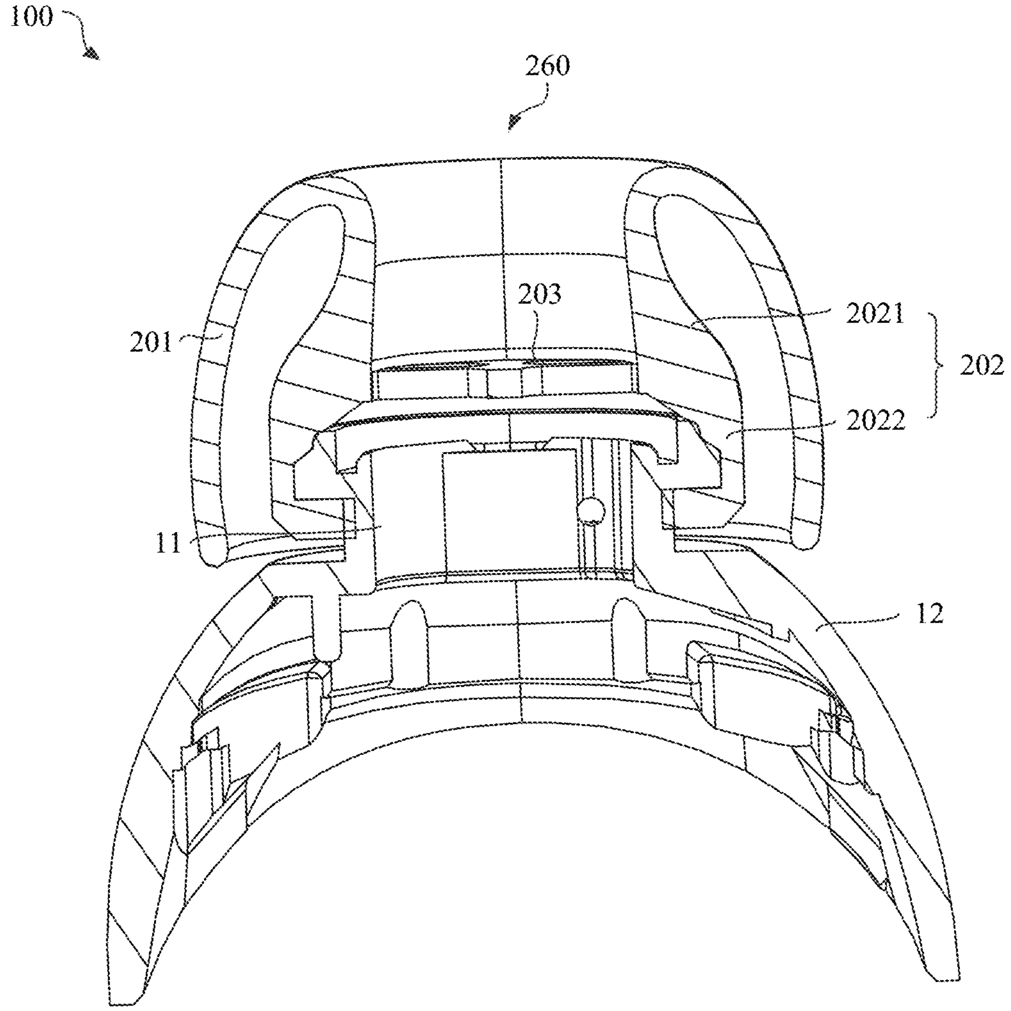
FIG. 18 is a schematic cross-sectional diagram of a housing and an eartip in an earphone according to an embodiment of this application.

Specifically, for example, the axial size of the sixth eartip 260 is greater than the axial size of the seventh eartip 270. FIG. 18 is a sectional view when the sixth eartip 260 cooperates with the sound outlet 12. FIG. 5 is a sectional view when the seventh eartip 270 cooperates with the sound outlet 12.

When the sixth eartip 260 cooperates with the sound outlet 12, the sixth eartip 260 cooperates with the sound outlet 12 to form an earphone 100. Because a length of the sixth eartip 260 is relatively long, the earphone 100 has good sealing after being worn. When the seventh eartip 270) cooperates with the sound outlet 12, the seventh eartip 270 cooperates with the sound outlet 12 to form an earphone 100. Because a length of the seventh eartip 270 is relatively short and an in-ear depth of the earphone 100 is relatively shallow; the earphone 100 has a large amount of leakage after being worn.

In this way, when an ear canal of a human body is blocked and an occlusion effect is serious, the seventh eartip 270 with a relatively short axial size may be used to increase an amount of leakage, thereby alleviating or avoiding the occlusion effect. When sound quality and a noise reduction effect of the earphone 100 are poor, the sixth eartip 260 with a relatively long axial size and good sealing may be used, thereby improving the sound quality and the noise reduction effect of the earphone 100.

That is, in this embodiment of this application, on a basis of adjusting a cooperation relationship between the eartip 20 and the sound outlet 12 so that a first vent hole 30 located on a housing 10 is completely exposed or a relatively small part is shielded, an amount of leakage may be adjusted by wearing the sixth eartip 260 or the seventh eartip 270 of different axial sizes, so as to implement flexible switching between different application scenarios such as listening, noise reduction, and occlusion effect optimization.

Other technical features are the same as those in Embodiment 1 or Embodiment 2, and a same technical effect can be achieved. Details are not described herein again.

Embodiment 4

Figure 19:
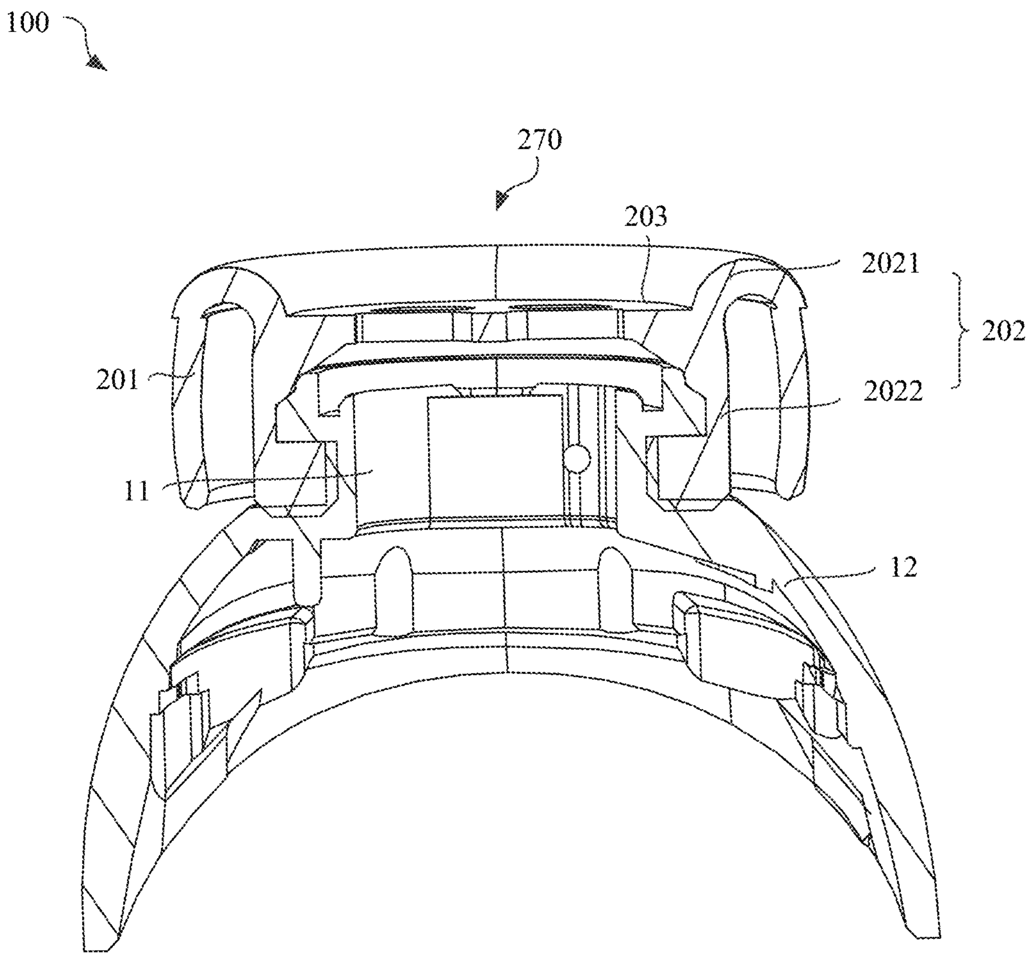
FIG. 19 is a schematic cross-sectional diagram of a housing and an eartip in an earphone according to an embodiment of this application.

An embodiment of this application further provides an earphone 100 of another structure. The earphone 100 may include a housing 10 and at least one eartip 20, and the housing 10 is provided with a sound outlet 12. Referring to FIG. 18 or FIG. 19, the at least one eartip 20 may include a sixth eartip 260 and a seventh eartip 270. The sixth eartip 260 may cooperate with the sound outlet 12, or the seventh eartip 270 may cooperate with the sound outlet 12.

In this embodiment of this application, an axial size of the sixth eartip 260 is different from an axial size of the seventh eartip 270. It should be noted that the axial size of the sixth eartip 260 refers to a size of the sixth eartip 260 in an axial direction of the sixth eartip 260; and the axial size of the seventh eartip 270 refers to a size of the seventh eartip 270 in an axial direction of the seventh eartip 270.

Two different eartips 20 are disposed, that is, the sixth eartip 260 and the seventh eartip 270. The axial size of the sixth eartip 260 is different from the axial size of the seventh eartip 270. In specific use, when the eartip 20 with a relatively large axial size cooperates with the sound outlet 12 to form an earphone 100, because the eartip 20 has a relatively long length and has a relatively deep in-ear depth of the earphone 100, the earphone 100 has good sealing after being worn. When the eartip 20 with a relatively small axial size cooperates with the sound outlet 12 to form an earphone 100, because the eartip 20 has a relatively small length and a relatively small in-ear depth of the earphone 100, the earphone 100 has a relatively large amount of leakage after being worn. In this way: when an ear canal of a human body is blocked and an occlusion effect is serious, the eartip 20 with a relatively small axial size can be used to increase an amount of leakage, thereby alleviating or avoiding the occlusion effect. When sound quality and a noise reduction effect of the earphone 100 are poor, the eartip 20 with a relatively large axial size and good sealing may be used, to improve the sound quality and the noise reduction effect of the earphone 100. Therefore, in this embodiment of this application, the sound quality and the noise reduction effect of the earphone 100 are prevented from being affected, and the occlusion effect can be effectively alleviated by using the sixth eartip 260 or the seventh eartip 270 with different axial sizes.

It can be understood that, in this embodiment of this application, each eartip 20 may further include a separator 203, where the separator 203 is connected to an inner enclosing shell 202. The separator 203 divides the inner enclosing shell 202 into a first part 2021 and a second part 2022.

One end that is of the first part 2021 and that is away from the second part 2022 is connected to an outer enclosing shell 201, and the second part 2022 and the separator 203 may be enclosed together to form a fitting cavity 204. When the eartip 20 cooperates with the sound outlet 12, at least a part of the sound outlet 12 is located in the fitting cavity 204. An axial size of the first part 2021 of the inner enclosing shell 202 of the sixth eartip 260 is different from an axial size of the first part 2021 of the inner enclosing shell 202 of the seventh eartip 270.

It should be noted that the axial size of the first part 2021 of the inner enclosing shell 202 of the sixth eartip 260 refers to a size of the first part 2021 of the inner enclosing shell 202 of the sixth eartip 260 in an axial direction of the sixth eartip 260; and the axial size of the first part 2021 of the inner enclosing shell 202 of the seventh eartip 270 refers to a size of the first part 2021 of the inner enclosing shell 202 of the seventh eartip 270 in an axial direction of the seventh eartip 270.

For example, the axial size of the first part 2021 of the inner enclosing shell 202 of the sixth eartip 260 is greater than the axial size of the first part 2021 of the inner enclosing shell 202 of the seventh eartip 270. FIG. 18 is a sectional view when the sixth eartip 260 cooperates with the sound outlet 12. FIG. 5 is a sectional view when the seventh eartip 270 cooperates with the sound outlet 12.

When the sixth eartip 260 cooperates with the sound outlet 12, the sixth eartip 260 cooperates with the sound outlet 12 to form an earphone 100. Because a length of the first part 2021 of the inner enclosing shell 202 of the sixth eartip 260 is relatively long, the earphone 100 has good sealing after being worn. When the seventh eartip 270 cooperates with the sound outlet 12, the seventh eartip 270 cooperates with the sound outlet 12 to form an earphone 100. Because a length of the first part 2021 of the inner enclosing shell 202 of the seventh eartip 270 is relatively short, and an ear penetration depth of the earphone 100 is relatively shallow; the earphone 100 has a large amount of leakage after being worn.

In this way, when the ear canal of the human body is blocked and the occlusion effect is serious, the seventh eartip 270 with a relatively short axial size of the first part 2021 of the inner enclosing shell 202 may be used to increase the amount of leakage, thereby alleviating or avoiding the occlusion effect. When the sound quality and the noise reduction effect of the earphone 100 are poor, the sixth eartip 260 with a relatively long axial size of the first part 2021 of the inner enclosing shell 202 and good sealing may be used, to improve the sound quality and the noise reduction effect of the earphone 100.

That is, in this embodiment of this application, an amount of leakage may be adjusted by wearing the sixth eartip 260 or the seventh eartip 270, so as to implement flexible switching between different application scenarios such as listening, noise reduction (the sixth eartip 260 is used and has good sealing after being worn), and occlusion effect optimization (the seventh eartip 270 is used and has a large amount of leakage after being worn).

In this embodiment of this application, one of an outer peripheral wall of the sound outlet 12 and an inner peripheral wall of the outer enclosing shell 201 may be provided with at least one protruding part 121, the other of the outer peripheral wall of the sound outlet 12 and the inner peripheral wall of the outer enclosing shell 201 may be provided with at least one second groove 2020, and the protruding part 121 cooperates with the second groove 2020. In this way, positions of the sound outlet 12 and the eartip 20 can be limited, so as to avoid relative position movement of the sound outlet 12 and the eartip 20 during a cooperation process, and even a problem that the eartip 20 falls off from the sound outlet 12.

In some embodiments, at least one opening 2031 may be further disposed on the separator 203, and the opening 2031 is configured to output a sound output from the sound outlet 12 to an ear of a user. At least one opening 2031 is disposed on the separator 203, and the opening 2031 outputs the sound output by the sound outlet 12 to the ear of the user, so that energy generated by a speaker in the housing 10 is smoothly transmitted to the ear of the user, thereby optimizing a sound production effect of the earphone 100.

In addition, in this embodiment of this application, the housing 10 may further include a stem 70, and one end of the stem 70 is connected to a side that is of the housing 10 and that is away from the sound outlet 12. In this way, a structure of the earphone 100 in this embodiment of this application may also be applicable to an earphone 100 with the stem 70.

In the descriptions of embodiments of this application, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship between two elements. A person of ordinary skill in the art can understand specific meanings of the foregoing terms in embodiments of this application based on a specific situation.

The device or element referred to in or implied in embodiments of this specification needs to have a specific orientation, be constructed and operated in a specific orientation, and therefore cannot be construed as a limitation on embodiments of this specification. In the descriptions of embodiments of this application, "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "may include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

Finally, it should be noted that the foregoing embodiments are only used to illustrate the technical solutions of embodiments of this application, but are not used to limit this application. Although embodiments of this application has been described in detail with reference to the foregoing embodiments, it should be understood by a person of ordinary skill in the art that the technical solutions described in the foregoing embodiments may still be modified, or some or all technical features thereof are equivalently replaced. These modifications or replacements do not make the essence of the corresponding technical solutions depart from the scope of the technical solutions of embodiments of this application.

What is claimed is:

1. An earphone, comprising at least:

a housing and at least one eartip; wherein the housing comprises a housing body and a sound outlet connected to the housing body, and at least one first vent hole is disposed on the housing;

the eartip cooperates with the sound outlet, so that at least one the first vent hole is completely exposed or at least partially shielded;

each eartip comprises an inner enclosing shell, wherein at least one third vent hole is disposed on the inner enclosing shell;

the at least one first vent hole comprises at least one vent hole group; each the vent hole group comprises a first sub vent hole and a second sub vent hole; and an inner diameter of the first sub vent hole is different from an inner diameter of the second sub vent hole;

an inner diameter of the third vent hole is greater than the inner diameter of the first sub vent hole and the inner diameter of the second sub vent hole; and when the eartip cooperates with the sound outlet, the third vent hole is opposite to the first sub vent hole, or the third vent hole is opposite to the second sub vent hole.

2. The earphone according to claim 1, further comprising a speaker located in the housing; wherein a first cavity is formed between the housing and a surface that is of the speaker and that faces the sound outlet, and a second cavity is formed between the housing and a surface that is of the speaker and that is away from the sound outlet; and the at least one first vent hole is connected to the first cavity.

3. The earphone according to claim 2, wherein the sound outlet is configured to output sound generated by the speaker to an ear of a user, and the at least one first vent hole is configured to conduct the first cavity to an ambient environment.

4. The earphone according to claim 2, wherein the housing body comprises a body part and a surrounding part connected to the body part;

an outer ring side of the surrounding part is connected to the body part, and an inner ring side of the surrounding part is connected to the sound outlet; and an axial direction of the surrounding part is the same as an axial direction of the sound outlet.

5. The earphone according to claim 4, wherein each the eartip comprises an outer enclosing shell; and the outer enclosing shell is disposed on an outer side of the inner enclosing shell; and the inner enclosing shell is configured to shield the first vent hole.

6. The earphone according to claim 5, wherein the at least one first vent hole is located on the surrounding part.

7. The earphone according to claim 6, wherein the at least one eartip comprises a first eartip and a second eartip;

an axial size of an inner enclosing shell of the first eartip is less than an axial size of an inner enclosing shell of the second eartip;

when the first eartip cooperates with the sound outlet, there is an interval between the surrounding part and an end that is of the inner enclosing shell of the first eartip and that is close to the housing body, so that the first vent hole is completely exposed; and when the second eartip cooperates with the sound outlet, an end that is of the inner enclosing shell of the second eartip and that is close to the housing body abuts against the surrounding part, so as to shield at least a part of the first vent hole.

8. The earphone according to claim 7, wherein a blocking part is disposed on a side that is of the surrounding part and that is close to the body part, and the blocking part, the surrounding part and an outer side wall of the sound outlet are enclosed together to form a first groove; and an end that is of the inner enclosing shell of the first eartip and that is close to the housing body or an end that is of the inner enclosing shell of the second eartip and that is close to the housing body extends into the first groove.

9. The earphone according to claim 6, wherein at least one second vent hole is further disposed on the body part; and the at least one second vent hole is connected to the first cavity.

10. The earphone according to claim 5, wherein the at least one first vent hole is located on a side wall of the sound outlet.

11. The earphone according to claim 10, wherein when the eartip cooperates with the sound outlet, the third vent hole is at least partially opposite to the first vent hole; or the third vent is staggered from the first vent hole.

12. The earphone according to claim 11, wherein the at least one vent hole group comprises a first vent hole group and a second vent hole group;

a line between a first sub vent hole in the first vent hole group and a first sub vent hole in the second vent hole group does not intersect a line between a second sub vent hole in the first vent hole group and a second sub vent hole in the second vent hole group;

the at least one eartip comprises a third eartip, wherein there are two third vent holes on a side wall of an inner enclosing shell of the third eartip;

when the third eartip and the sound outlet are in a first cooperation state, one of the two third vent holes is opposite to the first sub vent hole in the first vent hole group, and the other of the two third vent holes is opposite to the first sub vent hole in the second vent hole group; and when the third eartip and the sound outlet are in a second cooperation state, one of the two third vent holes is opposite to the second sub vent hole in the first vent hole group, and the other of the two third vent holes is opposite to the second sub vent hole in the second vent hole group.

13. The earphone according to claim 11, wherein the at least one vent hole group comprises a first vent hole group and a second vent hole group;

a line between a first sub vent hole in the first vent hole group and a first sub vent hole in the second vent hole group intersects a line between a second sub vent hole in the first vent hole group and a second sub vent hole in the second vent hole group;

the at least one eartip comprises a fourth eartip and a fifth eartip, wherein both a side wall of an inner enclosing shell of the fourth eartip and a side wall of an inner enclosing shell of the fifth eartip are provided with two third vent holes; and when the fourth eartip cooperates with the sound outlet, one of the two third vent holes on the side wall of the inner enclosing shell of the fourth eartip is opposite to the first sub vent hole in the first vent hole group; and the other of the two third vent holes is opposite to the first sub vent hole in the second vent hole group; or when the fifth eartip cooperates with the sound outlet, one of the two third vent holes on the side wall of the inner enclosing shell of the fifth eartip is opposite to the second sub vent hole in the first vent hole group, and the other of the two third vent holes is opposite to the second sub vent hole in the second vent hole group.

14. The earphone according to claim 5, wherein the at least one eartip comprises a sixth eartip and a seventh eartip;

the sixth eartip cooperates with the sound outlet, or the seventh eartip cooperates with the sound outlet; and an axial size of the sixth eartip is different from an axial size of the seventh eartip.

15. The earphone according to claim 5, wherein each the eartip further comprises a separator; and the separator is connected to the inner enclosing shell, and the separator divides the inner enclosing shell into a first part and a second part;

one end that is of the first part and that is away from the second part is connected to the outer enclosing shell;

the second part and the separator are enclosed together to form a fitting cavity, and when the eartip cooperates with the sound outlet, at least a part of the sound outlet is located in the fitting cavity; and the second part is configured to shield the first vent hole.

16. The earphone according to claim 15, wherein at least one opening is further disposed on the separator, and the opening is configured to output a sound output from the sound outlet to the ear of the user.

17. The earphone according to claim 5, wherein one of an outer peripheral wall of the sound outlet and an inner peripheral wall of the inner enclosing shell is provided with at least one protruding part, and the other of the outer peripheral wall of the sound outlet and the inner peripheral wall of the inner enclosing shell is provided with at least one second groove; and the protruding part cooperates with the second groove.

18. The earphone according to claim 1, wherein the housing further comprises a stem; and one end of the stem is connected to a side that is of the housing and that is away from the sound outlet.

* * * * *